United States Patent
Zhang et al.

(10) Patent No.: US 8,285,530 B2
(45) Date of Patent: Oct. 9, 2012

(54) UPWIND ALGORITHM FOR SOLVING LUBRICATION EQUATIONS

(75) Inventors: Jie Zhang, Santa Clara, CA (US);
Jiun-Der Yu, Sunnyvale, CA (US);
Shinri Sakai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 537 days.

(21) Appl. No.: 12/579,645

(22) Filed: Oct. 15, 2009

(65) Prior Publication Data

US 2011/0093241 A1    Apr. 21, 2011

(51) Int. Cl.
*G06G 7/50* (2006.01)
(52) U.S. Cl. ............................................. 703/9
(58) Field of Classification Search ........... 703/9, 18; 210/321.71
See application file for complete search history.

(56) References Cited

U.S. PATENT DOCUMENTS

| | | | |
|---|---|---|---|
| 5,619,433 A * | 4/1997 | Wang et al. ............... | 703/18 |
| 6,391,986 B1 | 5/2002 | Goode et al. | |
| 6,471,761 B2 | 10/2002 | Fan et al. | |
| 6,660,209 B2 | 12/2003 | Leyden et al. | |
| 6,754,551 B1 | 6/2004 | Zohar et al. | |
| 6,913,832 B2 | 7/2005 | Fan et al. | |
| 7,022,534 B2 | 4/2006 | Gupta et al. | |
| 7,085,695 B2 | 8/2006 | Yu et al. | |
| 7,117,138 B2 | 10/2006 | Yu et al. | |
| 7,147,306 B2 | 12/2006 | Silverbrook et al. | |
| 7,160,633 B2 | 1/2007 | Tai et al. | |
| 7,169,989 B2 | 1/2007 | Marks et al. | |
| 7,176,040 B2 | 2/2007 | Sirringhaus et al. | |
| 2005/0052120 A1 | 3/2005 | Gupta et al. | |
| 2006/0259288 A1 | 11/2006 | Yu | |
| 2007/0043544 A1* | 2/2007 | Song et al. ............... | 703/9 |
| 2007/0136042 A1 | 6/2007 | Yu | |
| 2007/0239414 A1 | 10/2007 | Song et al. | |
| 2007/0250296 A1 | 10/2007 | Shima et al. | |
| 2008/0103742 A1* | 5/2008 | Yu ............................. | 703/9 |
| 2008/0126046 A1* | 5/2008 | Yu ............................. | 703/9 |
| 2008/0177519 A1* | 7/2008 | Miller et al. ............... | 703/9 |
| 2009/0107907 A1* | 4/2009 | Chen et al. ............... | 210/321.71 |
| 2009/0119081 A1* | 5/2009 | Yu ............................. | 703/9 |
| 2009/0228258 A1* | 9/2009 | Zhang et al. ............... | 703/9 |

FOREIGN PATENT DOCUMENTS

| | | |
|---|---|---|
| EP | 0 765 236 B1 | 7/1999 |
| EP | 1 208 985 A2 | 5/2002 |
| JP | 10-256330 | 9/1998 |

OTHER PUBLICATIONS

Guena, G., et al., "Evaporation of sessile liquid droplets", Elsevier, Colloids and Surfaces A: Physicochem Eng. Aspects 291, 2006, pp. 191-196.

(Continued)

*Primary Examiner* — Kandasamy Thangavelu

(57) ABSTRACT

An embodiment of the present invention may be a system or method for simulating a physical process. The physical process being simulated may be in a droplet. The process being simulated may be the drying of a droplet on a substrate. Simulating the physical process may include using a finite difference scheme to approximate a differential of a function. The function may be dependent on a plurality of variables. The location in space at which one or more of the variables is evaluated may depend on the sign of one or more of the variables and upon which portion of the finite difference equation is being evaluated.

8 Claims, 25 Drawing Sheets

OTHER PUBLICATIONS

Hu, H., et al., "Evaporation of a Sessile Droplet on a Substrate", J. Phys. Chem. B, 2002, 106, pp. 1334-1344.

Schunk, P.R., et al., "Finite element modeling of evaporation and condensation during sol-gel film and fiber formation", VIII International Conference on Finite Elements in Fluids, Barcelona, Spain Sep. 20-24, 1993.

de Gans, Berend-Jan, et al., "Inkjet Printing of Polymers: State of the Art and Future Developments", Advanced Materials, 2004, 16, No. 3, Feb. 3.

Chernyak, V., "The Kinetic Theory of Droplet Evaporation", J. Aerosol Sci., vol. 26, No. 6, pp. 873-885, 1995.

Widjaja, E., et al., "Numerical study of vapor phase-diffusion driven sessile drop evaporation", Elsevier, Computers & Chemical Engineering 32, 2008, pp. 2169-2178.

Bayada, G., et al., "On a free boundary problem for the Reynolds equation derived from the Stokes system with Tresca boundary conditions" Journal of Mathematical Analysis and Applications, J. Math. Anal. Appl. 282, 2003, pp. 212-231.

Deegan, R., "Pattern formation in drying drops", Physical Review E, vol. 61, No. 1, Jan. 2000, pp. 475-485.

Percin, G., et al., "Piezoelectric droplet ejector for ink-jet printing of fluids and solid particles", Review of Scientific Instruments, vol. 74, No. 2, Feb. 2003, pp. 1120-1127.

Tarasevich, Y., "Simple analytical model of capillary flow in an evaporating sessile drop", Physical Review E 71, 027301, 2005.

Decent, S.P., "The spreading of a viscous microdrop on a solid surface", Microfluid Nanofluid, 2006, 2: 537-549.

Schwartz, L.W., "Theoretical and Numerical Modeling of Coating Flow on Simple and Complex Substrates including Rheology, Drying and Marangoni Effects", Advances in Coating and Drying of Thin Films, 1999.

Chen, C, et al., "Uniform Solute Deposition of Evaporable Droplet in Nanoliter Wells", Journal of Microelectromechanical Systems, vol. 16, No. 5, Oct. 2007, pp. 1209-1218.

Ozawa, K, et al., "Modeling of the Drying Process of Liquid Droplet to Form Thin Film", Japanese Journal of Applied Physics, vol. 44, No. 6A, 2005, pp. 4229-4234.

Fischer, B., "Particle Convection in an Evaporating Colloidal Droplet", Langmuir 2002, 18, pp. 60-67.

Liou, M., "A Generalized Procedure for Constructing an Upwind-Based TVD Scheme", 25th Aerospace Sciences Meeting, Jan. 12-15, 1987.

Harten, Ami, et al., "Uniformly High Order Accurate Essentially Non-Oscillatory Schemes III", Institute for Computer Applications in Science and Engineering NASA, Apr. 1986.

Chen, et al., "Evaporation evolution of volatile liquid droplets in nanoliter wells", Sensors and Actuators A 130-131 (2006) 12-19.

Tseng, F.G., et al., "A High-Resolution High-Frequency Monolithic Top-Shooting Microinjector Free of Satellite Drops-Part I: Concept, Design, and Model", Journal of Microelectromechanical Systems, vol. 11, No. 5, Oct. 2002, pp. 427-436.

Pasandideh-Fard, M., et al., "A three-dimensional model of droplet impact and solidification", International Journal of Heat and Mass Transfer 45, 2002, pp. 2229-2242.

Hu, H., et al., "Analysis of the Microfluid Flow in an Evaporating Sessile Droplet", Langmuir 2005, 21, pp. 3963-3971.

Hu, H., et al., "Analysis of the Effects of Marangoni Stresses on the Microflow in an Evaporating Sessile Droplet", Langmuir 2005, 21, pp. 3972-3980.

Deegan, R., et al., "Capillary flow as the cause of ring stains from dried liquid drops", Nature, vol. 389, Oct. 1997, pp. 827-829.

Deegan, R., et al., "Capillary flow as the cause of ring stains from dried liquid drops", James Franck Institute, Chicago, IL, Jul. 15, 1997, pp. 1-4.

Popov, Y.O., et al., "Characteristic Angles in the Wetting of an Angular Region: Deposit Growth", Department of Physics, University of Chicago, Jun. 6, 2003, pp. 1-36.

Deegan, R., et al., "Contact line deposits in an evaporating drop", Physical Review E., vol. 62, No. 1, Jul. 2000, pp. 756-765.

Sultan, E., et al., "Diffusion-limited evaporation of thin polar liquid films", Journal of Engineering Mathematics 50: 2004, pp. 209-222.

Widjaja, E., et al., "Dynamics of sessile droplet evaporation: A comparison of the spine and the elliptic mesh generation methods", Elsevier, Computers & Chemical Engineering 31, 2007, pp. 219-232.

Bonn, D., et al., Wetting and Spreading, Review of Modern Physics, vol. 81, Apr.-Jun. 2009, pp. 739-805.

\* cited by examiner

UPWIND ALGORITHM FOR SOLVING LUBRICATION EQUATIONS

CROSS-REFERENCE TO RELATED APPLICATIONS

The present application is related to U.S. patent application Ser. No. 12/476,588 filed on Jun. 2, 2009 entitled "A Finite Difference Algorithm for Solving Lubrication Equations with Solute Diffusion" and is hereby incorporated by reference in its entirety. The present application is also related to U.S. patent application Ser. No. 12/411,810 filed on Mar. 26, 2009 entitled "A Finite Element Algorithm for Solving a Fourth Order Nonlinear Lubrication Equation for Droplet Evaporation", and is hereby incorporated by reference in its entirety

BACKGROUND

1. Field of Invention

The present application is directed towards a system and method for simulating the evaporation of a droplet.

2. Description of the Related Art

Applying inkjet technology to the industrial printing process can greatly improve its efficiency. Inkjet technology can be used to save energy, material, money, and it can also help improve the environment. Inkjet technology may be used to manufacture of liquid crystal displays (LCD), thin film transistors (TFT), organic light emitting diodes (OLED), solar cells, micro-circuits, and other planar, layered, and 3-D structures. In the inkjet printing process, small droplets of a solution containing a solute with the desired properties and a solvent to make the solution jettable are deposited onto the target area. After the droplets reach the targeted area, the solvent evaporates and only the solute is left to form a final print pattern. The final pattern of the deposited solute directly determines the quality of the desired product.

In order to improve the quality of the final product, it is desirable to understand how the final pattern is formed in a realistic environment, what are the major factors affecting the final pattern, and how to control the production parameters in order to achieve a final product with the desired quality. In the final stage of ink drying process, the aspect ratio of length to height becomes quite large. Consequently, it is difficult to use traditional direct simulation methods to simulate the entire process. Lubrication equations may be applied to describe such phenomenon however in the prior art the use of lubrication type equations has been limited to flat surfaces.

A lubrication type concentration equation may also be used to describe the evolution of the concentration of solute in the droplet. This lubrication type concentration equation may describe the effect of fluid flowing inside the droplet and the effect of diffusion. The applicants have found that when the effect of diffusion is small relative to the effect of the flow of fluid, oscillations develop in the simulation that are not found in the physical system being simulated. The applicants have developed systems and methods for addressing this problem.

The present invention is directed towards addressing the problem of solving lubrication equations on a non-flat surface.

SUMMARY OF INVENTION

An embodiment of the present invention may be a system or method for simulating a physical process. The physical process being simulated may be in a droplet. The process being simulated may be the drying of a droplet on a substrate. Simulating the physical process may include using a finite difference scheme to approximate a differential of a function. The function may be dependent on a plurality of variables. The location in space at which one or more the variables is evaluated may depend on the sign of one or more of the variables and upon which portion of the finite difference equation is being evaluated.

An embodiment of the present invention may be a system or method for simulating the drying pattern of a droplet. An embodiment of the present invention may be a series of instructions encoded onto a computer-readable medium such as those in a software program. The present invention may evaluate a differential of a first function. The first function may be evaluated at a first point in space with a finite difference approximation. The differential of the first function is a representative approximation of variation in a physical state of a system being simulated.

The finite difference approximation may be evaluated as being proportional to the difference between the first function evaluated at a second point and space and the first function evaluated at a third point in space.

If the second function evaluated at the second point in space is positive, then the first function at the second point in space is evaluated as proportional to the product of: a second function evaluated at the second point in space; and a third function evaluated at the first point in space.

If the second function evaluated at the second point in space is negative, then the first function at the second point in space is evaluated as proportional to the product of: a second function evaluated at the second point in space; and a third function evaluated at the fourth point in space.

If the second function evaluated at the third point in space is positive then, the first function at the third point in space is evaluated as proportional to the product of: a second function evaluated at the third point in space; and a third function evaluated at the fifth point in space.

If the second function evaluated at the third point in space is negative then, evaluating the first function at the third point in space as proportional to the product of: a second function evaluated at the third point in space; and a third function evaluated at the first point in space.

In an embodiment of the present invention, the second function is dependent upon a variable that is representative of a velocity of a fluid being simulated.

An embodiment of the present invention includes determining the first function at a second point in time and a first point in space based on: the first function evaluated at a second point in time and the first point in space; and the differential of the first function. The differential of the first function is a spatial derivate of the first function evaluated at the first point in time.

In an embodiment of the present invention the third function is a solute amount. The solute amount is proportional to a product of: a concentration of solute; and a thickness of the droplet.

In an embodiment of the present invention a convection function is dependent upon the differentiation of the first function. The convection function represents the effect of convection of fluid in the droplet has on a concentration profile of the droplet.

An embodiment of the present invention includes evaluating a height evolution equation that represents how a height variable varies over time. The height evolution equation describes the relationship between a temporal derivative and a fourth function. The fourth function includes a spatial derivative of a fifth function. The fifth function includes a product of a cube of a thickness of a droplet and a spatial derivative of a Laplacian of a height of a droplet. The height is representative of the height of the droplet above a plane. The thickness is representative of the height of the droplet above a non-flat substrate.

In an embodiment of the present invention the second function includes a product of a square of a thickness of the droplet and a spatial derivative of a Laplacian of a height of the droplet.

An embodiment of the present invention may be a system that includes a processor for performing the simulation of a droplet.

An embodiment of the present invention may include preparing a fluid in response to the results of a simulation.

In an embodiment of the present invention the second function is a radial velocity of the fluid in a droplet averaged over the thickness of the droplet.

An alternative embodiment of the present invention may include a computer-readable medium encoded with instructions for a processor to perform a method for simulating a final pattern of a droplet of a fluid. The method of simulating the final droplet of the fluid may include instructions for using lubrication equations to represent behavior of the droplet on a substrate. The lubrication equations may include a simulation space that is representative of the environment in which the droplet is being simulated. The lubrication equations may also include a velocity function that is representative of motion of fluid inside the droplet as a function of space and time. The lubrication equations may also include a thickness function that is representative of a height of the droplet above the substrate as a function of space and time. The lubrication equations may also include a concentration function that is representative of a concentration of solute in the droplet as a function of space and time. The lubrication equations may also include a solute amount function that is a product of the concentration function and the thickness function. The lubrication equations may also include a first function that is the product of the solute amount and the velocity function.

The alternative embodiment of the present invention may also include instructions for using a first equation to represent a relationship between a temporal derivative of the solute amount and a spatial derivative of the first function. The spatial derivate of the first function may be approximated at a first node in the simulation space by calculating a difference between the first function evaluated at a second point in the simulation space, and the first function evaluated at a third point in the simulation space. Evaluating the first function at the second point in the simulation space may include determining the sign of the velocity function at the second point in space.

If the averaged radial velocity at the second point in the simulation space is positive then the first function at the second point in the simulation space as the product of: the velocity function at the second point in the simulation space; and the solute amount at the first point in the simulation space.

If the averaged radial velocity at the second point in the simulation space is negative then, the first function is evaluated at the second point in the simulation space as the product of: the velocity function at the second point in the simulation space; and the solute amount at a fourth point in the simulation space.

If the averaged radial velocity at the third point in the simulation space is positive then the first function is evaluated at the third point in the simulation space as the product of: the velocity function at the third point in the simulation space; and the solute amount at the fifth point in the simulation space.

If the averaged radial velocity at the third point in the simulation space is negative then the first function is evaluated at the third point in the simulation space as the product of: the velocity function at the third point in the simulation space; and the solute amount at a first point in the simulation space.

The final pattern of the droplet is derived from solving the lubrication equations. The final pattern is stored.

In an alternative embodiment of the present invention the first function also represents how diffusion of a solute in a solvent effects the first product.

In an alternative embodiment of the present invention the effect of diffusion is not taken into account when an inverse of a dimensionless Schmidt like number is less than 0.0001. The inverse of the dimensionless Schmidt like number is equal to: a diffusion coefficient of a solution; multiplied by an initial height of the droplet raised to the fourth power, divided by two; divided by an initial evaporation rate of the droplet; and divided by an initial radius of the droplet.

In an alternative embodiment of the present invention the droplet is characterized as axi-symmetric. In an alternative embodiment of the present invention the substrate is a non-flat substrate. The lubrication equations also include a substrate function that is representative of the relative height of the substrate as function of space. There may be a height function that represents the height of the droplet above a plane as a function of space and time. The thickness function may be a function of the difference between the height function and the substrate function. There may be a second equation that represents how the height function varies over time. The second equation may describe the relationship between a temporal derivative of the height function and spatial derivates of the thickness function, the height function and an evaporation function that describes the rate at which solvent is evaporated from the droplet.

The second equation may include a first high order differential function that is representative of the behavior of a height of the droplet over time. A third function may be equated to a fourth function. The third function may represent a temporal derivative of the height function (H). The fourth function may include: a first term that is a function of the thickness function (H−f); and a Laplacian of the height function ($\nabla^2 H$).

In an alternative embodiment of the present invention the fourth function may include a second term that is representative of the evaporation rate of the droplet.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention can be best understood by reference to the following description taken in conjunction with the accompanying figures, in which like parts may be referred to by like numerals.

DESCRIPTION OF THE PREFERRED EMBODIMENTS

The present invention relates to systems and methods for simulating the evolution of droplet drying on a substrate. In an embodiment of the present invention the droplet may be produced using inkjet technology. The present invention may be used to simulate the evolution of droplets produced using other techniques without going beyond the spirit and scope of the present invention.

Inkjet technology is conventionally used to print ink on paper. However, a tremendous amount of resources can be saved by applying inkjet technology to other fabrication processes, such as semiconductor fabrication processes, LCD fabrication processes, TFT fabrication processes, OLED fabrication processes, solar cell fabrication processes, etc. In the inkjet printing process, small droplets of a solution containing a solute with the desired properties and a solvent are deposited onto the target area. After the droplets reach the targeted area, the solvent evaporates and only the solute is left forming a final print pattern. The final pattern of the solute deposit directly determines the desired product quality. An individual skilled in the art will appreciate that the present invention may be applied any droplet drying on a non-flat substrate. The targeted area on which the droplet is deposit may be a flat substrate or a non-flat substrate.

Figure 1:
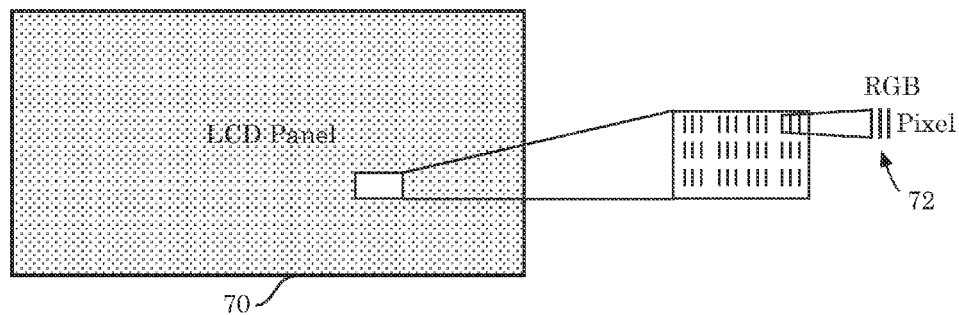
FIG. 1 illustrates an exemplary application of inkjet printing technology.

FIG. 1 is an illustration of an LCD panel 70, which is an exemplary product that can be produced using an industrial printing process such as inkjet printing technology. In an embodiment of the present invention, inkjet printing technology is used to fabricate the LCD panel 70. Traditionally, LCD panels 70 are fabricated using CMOS fabrication technology requiring several processing steps such as masking, deposition, unmasking, etc., to fabricate Red (R), Green (G), and Blue (B) filters 72 on a non-uniform substrate. Each color is made from a different material, and in the traditional fabrication method requires three separate processing steps.

Using inkjet technology, filters made from different materials may all be printed in a single step. Inkjet technology creates images and objects using small droplets of fluid. The inkjet printing head deposits small droplets in a desired pattern on a substrate. Until the droplets dry, the shapes of these droplets change continuously due to evaporation, surface tension, and other properties of the fluid and substrate. Therefore, the final pattern of the drops may change into a shape and size that is not desirable. For example, in LCD fabrication, if droplets for red filters and green filters are printed too far away from each other, a lower LCD resolution will result. However, if these droplets are placed too close, the drops may overlap when dried. It is also important to control the consistency and uniformity of the color of the filters which is controlled by their thickness and density of solute. Therefore, it is important to simulate the final pattern of a drop in order to proceed with confidence that the end product will be acceptable.

In an embodiment of the simulation, the simulation of the final shape of the droplet can be repeated several times while adjusting the fluid properties of the droplet until a desired final shape is obtained. It should be noted that FIG. 1 simply illustrates one of many uses of the inkjet technology in industrial applications.

Although simulations in a rectangular domain provide some insights into achieving a desired final pattern, in a realistic setup, the droplet is often located in a more complex bank structure. One technique for addressing this challenge is disclosed in application Ser. No. 12/043,867, filed on Mar. 6, 2008 (AP341HO), which is incorporated by reference for all purposes.

In the embodiments described herein a new finite difference algorithm for solving the lubrication equations for the evolution of both the interface shape and the solute concentration is provided. In an embodiment of the present invention the technique described herein is used to solve the solute equation. The technique is unique in that it can also accommodate a complex bank structure as well as a varying viscosity for the solvent.

Governing Equations

Initially, a liquid drop on a flat substrate with a pinned contact line is considered. The contact line may be represented by a plurality of points. Symmetry may be used to reduce the number of points that are used to represent the contact line. This is a reasonable assumption under many conditions. In a cylindrical coordinate system $(r^*, \theta^*, z^*)$, the velocities $\vec{v}^* = (v_r^*, v_\theta^*, v_z^*)$ satisfy the Navier-Stokes equations described in equations (1)-(3). The superscript * refers to fully dimensioned variables as opposed to dimensionless variables. Some of the variables discussed in the present application may also behave as a function and may be referred to as either functions or variables, while referring to substantially the same thing.

$$\rho^* \left( \frac{\partial v_r^*}{\partial t^*} + v_r^* \frac{\partial v_r^*}{\partial r^*} + \frac{v_\theta^*}{r^*} \frac{\partial v_r^*}{\partial \theta^*} - \frac{v_\theta^{*2}}{r^*} + v_z^* \frac{\partial v_r^*}{\partial z^*} \right) = \qquad (1)$$
$$-\frac{\partial p^*}{\partial r^*} + \left[ \frac{1}{r^*} \frac{\partial}{\partial r^*} (r^* \tau_{rr}^*) + \frac{1}{r^*} \frac{\partial \tau_{\theta r}^*}{\partial \theta^*} + \frac{\partial \tau_{zr}^*}{\partial z^*} - \frac{\tau_{\theta\theta}^*}{r^*} \right]$$

$$\rho^*\left(\frac{\partial v_\theta^*}{\partial t^*} + v_r^* \frac{\partial v_\theta^*}{\partial r^*} + \frac{v_\theta^*}{r^*}\frac{\partial v_\theta^*}{\partial \theta^*} + \frac{v_r^* v_\theta^*}{r^*} + v_z^*\frac{\partial v_\theta^*}{\partial z^*}\right) = \qquad (2)$$
$$-\frac{1}{r^*}\frac{\partial p^*}{\partial \theta^*} + \left[\frac{1}{r^{*2}}\frac{\partial}{\partial r^*}(r^{*2}\tau_{r\theta}^*) + \frac{1}{r^*}\frac{\partial \tau_{\theta\theta}^*}{\partial \theta^*} + \frac{\partial \tau_{\theta z}^*}{\partial z^*} + \frac{\tau_{r\theta}^* - \tau_{\theta r}^*}{r^*}\right]$$

$$\rho^*\left(\frac{\partial v_z^*}{\partial t^*} + v_r^*\frac{\partial v_z^*}{\partial r^*} + \frac{v_\theta^*}{r^*}\frac{\partial v_z^*}{\partial \theta^*} + v_z^*\frac{\partial v_z^*}{\partial z^*}\right) = \qquad (3)$$
$$-\frac{\partial p^*}{\partial z^*} + \left[\frac{1}{r^*}\frac{\partial}{\partial r^*}(r^*\tau_{rz}^*) + \frac{1}{r^*}\frac{\partial \tau_{\theta z}^*}{\partial \theta^*} + \frac{\partial \tau_{zz}^*}{\partial z^*}\right]$$

The fluid density $\rho^*$, viscosity $\mu^*$, pressure $p^*$, and velocities $\vec{v}^*$ are dimensional variables. The components of stress tensor $\tau^*$ used in equations (1)-(3) are described in equations (4)-(9).

$$\tau_{rr}^* = \mu^*\left(2\frac{\partial v_r^*}{\partial r^*} - \frac{2}{3}\nabla \cdot v^*\right) \qquad (4)$$

$$\tau_{\theta\theta}^* = \mu^*\left[2\left(\frac{1}{r^*}\frac{\partial v_\theta^*}{\partial \theta^*} + \frac{v_r^*}{r^*}\right) - \frac{2}{3}\nabla \cdot v^*\right] \qquad (5)$$

$$\tau_{zz}^* = \mu^*\left(2\frac{\partial v_z^*}{\partial z^*} - \frac{2}{3}\nabla \cdot v^*\right) \qquad (6)$$

$$\tau_{r\theta}^* = \tau_{\theta r}^* = \mu^*\left[r^*\frac{\partial}{\partial r^*}\left(\frac{v_\theta^*}{r^*}\right) + \frac{1}{r^*}\frac{\partial v_r^*}{\partial \theta^*}\right] \qquad (7)$$

$$\tau_{\theta z}^* = \tau_{z\theta}^* = \mu^*\left(\frac{\partial v_\theta^*}{\partial z^*} + \frac{1}{r^*}\frac{\partial v_z^*}{\partial \theta^*}\right) \qquad (8)$$

$$\tau_{rz}^* = \tau_{zr}^* = \mu^*\left(\frac{\partial v_z^*}{\partial r^*} + \frac{\partial v_r^*}{\partial z^*}\right) \qquad (9)$$

In an embodiment of the present invention it is reasonable to assume that the fluid is incompressible, such that boundary condition described by equation (10) applies.

$$\nabla \cdot v^* = 0 \qquad (10)$$

In an embodiment of the present invention it also reasonable to assume axial symmetry, such that the boundary conditions described by equations (11) apply.

$$\frac{\partial}{\partial \theta} = 0 \qquad (11)$$
$$v_\theta^* = 0$$

Equations (1) and (3) may be reduced taking the assumptions in equations (10) and (11) into account yielding equations (12) and (13) as a result, which also include the substitutions of equations (4)-(9). Equation (2) reduces to zero when the assumptions in equation (10) and (11) are taken into account.

$$\rho^*\left(\frac{\partial v_r^*}{\partial t^*} + v_r^*\frac{\partial v_r^*}{\partial r^*} + v_z^*\frac{\partial v_r^*}{\partial z^*}\right) = -\frac{\partial p^*}{\partial r^*} + \qquad (12)$$
$$\mu^*\left[\frac{\partial}{\partial r^*}\left(\frac{1}{r^*}\frac{\partial(r^* v_r^*)}{\partial r^*}\right) + \frac{\partial^2 v_r^*}{\partial z^{*2}}\right] + 2\frac{\partial v_r^*}{\partial r^*}\frac{\partial \mu^*}{\partial r^*} + \left(\frac{\partial v_z^*}{\partial r^*} + \frac{\partial v_r^*}{\partial z^*}\right)\frac{\partial \mu^*}{\partial z^*}$$

$$\rho^*\left(\frac{\partial v_z^*}{\partial t^*} + v_r^*\frac{\partial v_z^*}{\partial r^*} + v_z^*\frac{\partial v_z^*}{\partial z^*}\right) = \qquad (13)$$
$$-\frac{\partial p^*}{\partial z^*} + \mu^*\left[\frac{1}{r^*}\frac{\partial}{\partial r^*}\left(r^*\frac{\partial v_z^*}{\partial r^*}\right)\frac{\partial^2 v_z^*}{\partial z^{*2}}\right] + \left(\frac{\partial v_z^*}{\partial r^*} + \frac{\partial v_r^*}{\partial z^*}\right)\frac{\partial \mu^*}{\partial r^*} + 2\frac{\partial v_z^*}{\partial z^*}\frac{\partial \mu^*}{\partial z^*}$$

It should be appreciated that along the interface between the droplet and the environment, which may be a vacuum, normal stresses and tangential stresses are balanced as described by equations (14) and (15). The pressure $p^*$ in the droplet at the interface is balanced by the environmental pressure $p_A^*$, the surface energy which depend on the mean curvature of the droplet surface and the stress orthogonal to the interface as described by equation (14). In an embodiment of the present invention, which includes a simulation of a droplet evaporating in a vacuum, the tangential stress along the interface maybe zero as described by equation (15).

$$p^* = p_A^* - \frac{\sigma}{r^*}\frac{\partial}{\partial r^*}\left(\frac{r^*\frac{\partial h^*}{\partial r^*}}{\sqrt{1+\left(\frac{\partial h^*}{\partial r^*}\right)^2}}\right) + \qquad (14)$$
$$2\mu^*\frac{\left(\frac{\partial h^*}{\partial r^*}\right)^2\frac{\partial v_r^*}{\partial r^*} - \frac{\partial h^*}{\partial r^*}\left(\frac{\partial v_r^*}{\partial z^*} + \frac{\partial v_z^*}{\partial r^*}\right) + \frac{\partial v_z^*}{\partial z^*}}{1+\left(\frac{\partial h^*}{\partial r^*}\right)^2}$$

$$\frac{\partial h^*}{\partial r^*}\left(\frac{\partial v_r^*}{\partial r^*} - \frac{\partial v_z^*}{\partial z^*}\right) + \frac{1}{2}\left(\left(\frac{\partial h^*}{\partial r^*}\right)^2 - 1\right)\left(\frac{\partial v_r^*}{\partial z^*} + \frac{\partial v_z^*}{\partial r^*}\right) = 0 \qquad (15)$$

In an embodiment of the present invention it is reasonable to assume that that the ambient pressure $p_A^*$ is a constant or is zero if the droplet is in a vacuum. In the above equations $h^*$ is a function that describes the droplet profile as a function of time and space, e.g., in one embodiment is the height of the droplet above a first plane.

As mentioned above, the droplet is a solution composed of an incompressible fluid (solvent), and a solute. As the solvent evaporates into the ambient environment over time, the solute concentration increases, which in turn, causes the viscosity of the droplet to increase. The viscosity of the fluid may be represented by equation (16) in which $\eta_{sp}$ is the specific viscosity of the solution and $\mu_0^*$ is the initial fluid viscosity.

$$\mu^* = (1+\eta_{sp})\mu_0^* \qquad (16)$$

The specific viscosity $\eta_{sp}$ may be represented as a function of the solute concentration and/or time. In an embodiment of the present invention Ozawa's model as described in equation (17) may be used to describe how the specific viscosity $\theta_{sp}$ changes with the concentration. The variables $n_{ozawa}$ and the gelation concentration $C_g$ are dependent upon the materials used in the droplet. In an embodiment of the present invention $n_{ozawa}$ maybe 100 and the gelation concentration $C_g$ maybe 50%.

$$\eta_{sp} = \frac{1}{1-\left(\frac{C(r,t)}{C_g}\right)^{n_{ozawa}}} - 1 \qquad (17)$$

Figure 2:
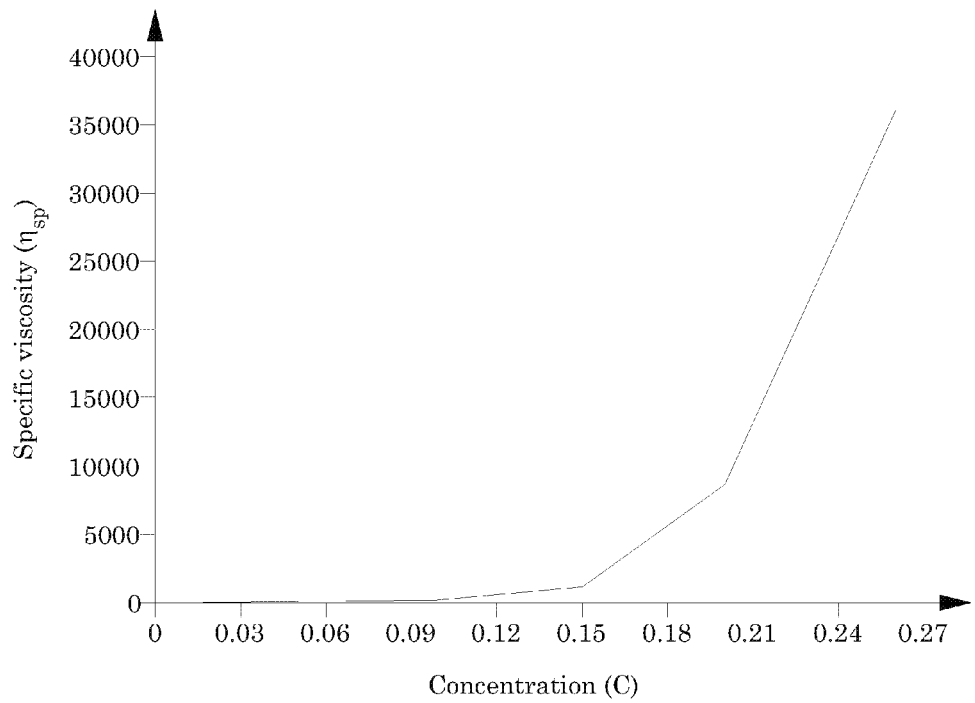
FIG. 2 is an illustration of experimental data that may be used in an embodiment of the present invention.

An embodiment of the present invention may instead use experimental data of the specific viscosity ($\eta_{sp}$) as a function of the concentration as illustrated in FIG. 2. An embodiment of the present invention may include other models of the specific viscosity.

In an embodiment of the present invention an appropriate time scale and a length scale are chosen. In an embodiment of the present invention these scales may be chosen relative to the height of the droplet and local velocity of the fluid. Other scales may be chosen without going beyond the scope and spirit of the present application. An individual skilled in the art will appreciate that these scales are chosen to ensure stability and accuracy of the simulation. Equations (18) describe how the velocity v, the pressure p, and the time t are scaled relative to a length $h_0^*$, a length $r_0^*$, a viscosity $\mu_0^*$, an evaporation rate $J_0^*$ and a density $\rho^*$ of the solvent. In the following discussion the evaporation rate $J_0^*$ is the initial average evaporation rate scaled per unit area of the droplet. The Reynolds number Re, may also be written in terms of those scaling parameters.

$$U_c^* = J_0^* \quad v_\theta^* = U_c^* v_\theta \quad v_r^* = U_c^* v_r \quad v_z^* = U_c^* v_z \quad (18)$$

$$r^* = r_0^* r \quad z^* = h_0^* z \quad Re = \frac{\rho^* U_c^* h_0^*}{\mu_0^*}$$

$$p_c^* = \frac{\mu_0^* U_c^* r_0^*}{h_0^{*2}} \quad p^* = p_c^* p_r$$

$$t_c^* = \frac{r_0^*}{U_c^*} \quad t^* = t_c^* t$$

In an embodiment of the present invention the ratio $\epsilon = h_0^*/r_0^*$ may be assumed to be small, this is a reasonable assumption for a thin droplet. Equations (12) and (13) may be written in terms of dimensionless variables and the ratio $\epsilon$ as shown in equations (19) and (20).

$$\epsilon Re\left(\frac{\partial v_r}{\partial t} + v_r\frac{\partial v_r}{\partial r} + v_z\frac{\partial v_r}{\partial z}\right) = (1+\eta_{sp})\left(\epsilon^2\frac{\partial}{\partial r}\left(\frac{1}{r}\frac{\partial(rv_r)}{\partial r}\right) + \frac{\partial^2 v_r}{\partial z^2}\right) - \quad (19)$$
$$\frac{\partial p}{\partial r} + \epsilon^2\frac{\partial v_r}{\partial r}\frac{\partial \eta_{sp}}{\partial r} + \left(\epsilon^2\frac{\partial v_z}{\partial r} + \frac{\partial v_r}{\partial z}\right)\frac{\partial \eta_{sp}}{\partial z}$$

$$\epsilon Re\left(\frac{\partial v_z}{\partial t} + v_r\frac{\partial v_z}{\partial r} + v_z\frac{\partial v_z}{\partial z}\right) = (1+\eta_{sp})\left(\epsilon^2\frac{\partial}{\partial r}\left(\frac{1}{r}\frac{\partial(rv_z)}{\partial r}\right) + \frac{\partial^2 v_z}{\partial z^2}\right) - \quad (20)$$
$$\frac{1}{\epsilon^2}\frac{\partial p}{\partial z} + \frac{\partial v_z}{\partial z}\frac{\partial \eta_{sp}}{\partial z} + \left(\epsilon^2\frac{\partial v_z}{\partial r} + \frac{\partial v_r}{\partial z}\right)\frac{\partial \eta_{sp}}{\partial r}$$

In an embodiment of the present invention it is assumed that the ratio $\epsilon$ is much less than one, in which case the relations set forth in equations (21) are also true.

$$\epsilon^2 \ll 1 \quad (21)$$
$$\epsilon Re \ll 1$$
$$\frac{\partial \eta_{sp}}{\partial z} = 0$$
$$\eta_{sp}\epsilon^2 \ll 1$$

Equations (21) may be used to sort the terms in equations (19) and (20) in order of the ratio $\epsilon$. Given the assumptions stated in equation (21), which are valid for a thin film, equation (19) may be modified by keeping only the leading order terms as shown in a simplified equation (22). Similarly, the leading order term of equation (20) may be kept and other terms dropped such that equation (24) may be used as a good approximation of equation (20).

$$-\frac{\partial p}{\partial r} + (1+\eta_{sp})\frac{\partial^2 v_r}{\partial z^2} = 0 \quad (22)$$

$$-\frac{\partial p}{\partial z} = 0 \quad (23)$$

The incompressible restraint condition on the fluid as described by equation (10) can be written in cylindrical coordinates as in equation (24) which also takes into account the non-rotational condition expressed by equations (11).

$$-\frac{1}{r}\frac{\partial}{\partial r}(rv_r) + \frac{\partial v_z}{\partial z} = 0 \quad (24)$$

In an embodiment of the present invention the ambient environment is a vacuum in which case $p_A^*$ is zero and $\epsilon^2\eta_{sp} \ll 1$. Converting equation (14) to dimensionless variables and keeping only leading order terms gives us an approximation of the normal stress condition as described by equation (25).

$$p = -\frac{1}{Ca}\frac{1}{r}\frac{\partial}{\partial r}\left(r\frac{\partial h}{\partial r}\right) \quad (25)$$

The Capillary number (Ca) may be defined as $$Ca = \frac{J_0^* \mu_0^*}{\epsilon^4 \sigma^*}.$$

Equation (26) is a dimensionless form of the leading order term that may be used as a reasonable approximation of the tangential stress condition described in equation (15).

$$\frac{\partial v_r}{\partial r} = 0 \quad (26)$$

Dimensionless lubrication type equations can be derived based upon the leading order terms stated in equations (22)-(26). These lubrication type equations may be used to represent the evolution over time of the droplet height profile h and solute concentration C.

The kinematic boundary condition along the interface is described in equations (27) in both dimensioned and dimensionless form. The variable J* is the dimensioned evaporation rate which may be a function of both space and time. In an alternative embodiment of the present invention the evaporation rate is constant. The evaporation rate may also be defined in terms of another system variable such as the height h or the concentration C. The variable E=½ is a dimensionless scaling parameter. Equation (27) is a lubrication type equation that is representative of the evolution of the height of a droplet as the droplet evaporates. An individual skilled in the art will appreciate how to adapt equation (27) to represent how mechanisms other than evaporation may effect how the height of the profile varies over time. Examples of such mechanisms include condensation, chemical reactions, absorption, and other mechanisms that have an effect on the volume or type of material in the droplet.

$$\frac{\partial h^*}{\partial t^*} = -\frac{1}{r^*}\frac{\partial}{\partial r^*}(r^* h^* \langle v_r^* \rangle) - J^*(r^*, t^*) \quad (27)$$

$$\frac{\partial h}{\partial t} = -\frac{1}{r}\frac{\partial}{\partial r}(rh\langle v_r \rangle) - EJ(r, t)$$

The variable $\langle v_r^* \rangle$ as described by equation (28) is the radial velocity averaged across the vertical axis.

$$\langle v_r^* \rangle = \frac{1}{h^*}\int_0^{h^*} v_r^* dz^* \quad (28)$$

Equation (22) may be integrated twice over the variable z to give a definition of $v_r$ in terms of the pressure p and the axial dimension z. Equation (22) is approximately independent of z as described by equation (23). Equation (23) is a useful approximation that allows us to significantly simplify the problem. Equation (25) may be substituted into equation (22). These approximations allow the radial velocity to be written in terms of the height of the droplet as shown in equation (29). The capillary number Ca, as used in equation (29) is a scaling parameter of the simulation and is representative of the relative effect of viscous forces versus surface tension at the interface.

$$\langle v_r \rangle = \frac{1}{h}\int_0^h v_r dz = \frac{-1}{3Ca}\frac{1}{1+\eta_{sp}}h^2\frac{\partial}{\partial r}\left(\frac{\partial^2 h}{\partial r^2} + \frac{1}{r}\frac{\partial h}{\partial r}\right) \quad (29)$$

Equation (29) may be substituted into equation (27) providing a description of how the height of the droplet varies over time as shown in equation (30).

$$\frac{\partial h}{\partial t} = \frac{1}{r}\frac{\partial}{\partial r}\left(\frac{1}{3Ca}\frac{1}{1+\eta_{sp}}h^3 r\frac{\partial}{\partial r}\left(\frac{\partial^2 h}{\partial r^2} + \frac{1}{r}\frac{\partial h}{\partial r}\right)\right) - EJ(r, t) \quad (30)$$

Equation (31) describes how the solute concentration satisfies the convection-diffusion equation. Equation (31) also describes how a solute amount $h^*C^*$ changes over time. The solute amount is a function that is representative of the total amount of solute found along the vertical axis of the droplet. Equation (31) includes two terms, a first term that is dependent on the velocity of the solution and a second term that describes the diffusion of the solute in the solvent. The second term of equation (31) includes a diffusion coefficient $D^*$ of the solute in the solvent which is dependent upon the properties of the solvent and the solute.

$$\frac{\partial (h^*C^*)}{\partial t^*} = -\frac{1}{r^*}\frac{\partial}{\partial r^*}(r^* h^* \langle v_r^* \rangle C^*) + \frac{1}{r^*}\frac{\partial}{\partial r^*}\left(D^* r^* h^* \frac{\partial C^*}{\partial r^*}\right) \quad (31)$$

The dimensionless form of equation (31) is equation (32).

$$\frac{\partial (hC)}{\partial t} = -\frac{1}{r}\frac{\partial}{\partial r}(rh\langle v_r \rangle C) + \frac{1}{r}\frac{\partial}{\partial r}\left(\frac{1}{Sc}rh\frac{\partial C}{\partial r}\right) \quad (32)$$

The variable Sc is a dimensionless Schmidt like number as defined in equation (33). In the context of the present application both equations (30) and (32) may be considered lubrication type equations.

$$\frac{1}{Sc} = \frac{D^* \mu_0^*}{Ca\sigma^* r_0^*} = \frac{D^* \varepsilon^4}{2J_0^* r_0^*} \quad (33)$$

In an embodiment of the present invention a solution to equations (30) and (32) is sought. In an embodiment of the present invention the computational domain may be scaled such that the dimensionless domain is between 0 and 1. In an embodiment of the present invention the boundary conditions are described by equations (34)-(35). Equation (35) describes a system in which the height of the contact line is zero and the total velocity of the contact line is zero. In other words the contact line is pinned.

$$\left.\frac{\partial h}{\partial r}\right|_{r=0} = 0 \quad (34)$$

$$\left.\frac{\partial^3 h}{\partial r^3}\right|_{r=0} = 0$$

$$\left.\frac{\partial C}{\partial r}\right|_{r=0} = 0$$

$$h|_{r=1} = 0 \quad (35)$$

$$h\langle v_r \rangle|_{r=1} = 0$$

Figure 3:
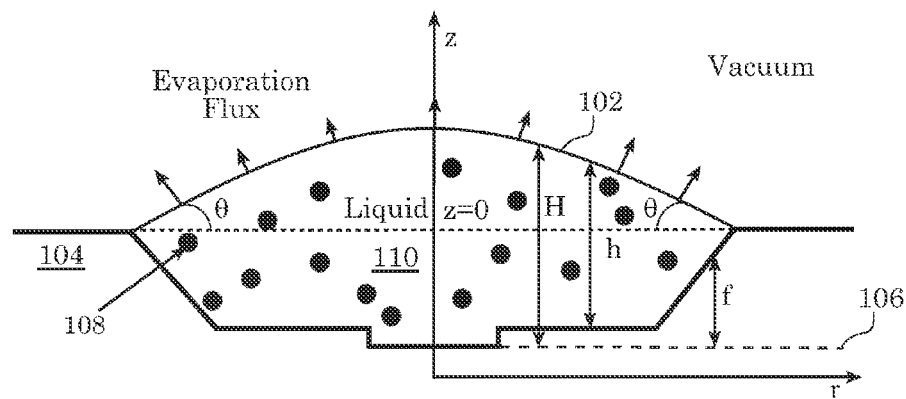
FIG. 3 is a simplified schematic diagram of a droplet disposed on a non-flat substrate in accordance with one embodiment of the invention.

The boundary condition on the third order partial derivative of the height of the droplet at the center of the droplet described in equations (34) is related to the total radial velocity of the fluid in the droplet. In an embodiment of the present invention it is reasonable to assume this boundary condition. An embodiment of the present invention may be used to describe the behavior of a droplet 102 sitting on a non-flat substrate 104 such as an OLED bank structure shown in FIG. 3. The variable H is representative of the height of the droplet 102 relative to a plane 106. The variable h is representative of the height of the droplet 102 relative to the substrate 104. The variable f is representative of the height of the non-flat substrate 104 relative to the plane 106. The droplet 102 is a solution of solute particles 108 that are dissolved in a solvent 110. In an embodiment of the present invention, the droplet 102 is a single phase fluid. It should be appreciated by an individual skilled in the art that the substrate 104 may represent any object including a semiconductor device in which the inkjet technique described herein is used in the manufacturing process. The r and z coordinate axes as illustrated in FIG. 3 are relative to a central region of droplet 102, although other origins may be used with out going beyond the scope and spirit of the applicants' invention. In the following discussion it is assumed that the height of the substrate (f) varies little over the spatial coordinate (r).

Equations (22)-(24), (26), and (27) still hold in the lubrication model for a non-flat substrate. Equation (36) is equation (28) rewritten in terms of the global height of the droplet above a plane H*, and the substrate f*.

$$\langle v_r^* \rangle = \frac{1}{H^* - f^*}\int_{f^*}^{H^*} v_r^* dz^* \quad (36)$$

In an embodiment of the present invention the radial velocity $v_r^*$, may be approximated using the leading order terms as shown in equation (37).

$$v_r^* = \frac{1}{\mu^*}\frac{\partial p^*}{\partial r^*}\left(\frac{1}{2}(z^{*2} - f^{*2}) - H^*(z^* - f^*)\right) \qquad (37)$$

The applicant's have found that when the substrate is taken into account, equation (25) may be written in terms of H as shown in equation (38).

$$p = -\frac{1}{Ca}\frac{1}{r}\frac{\partial}{\partial r}\left(r\frac{\partial H}{\partial r}\right) \qquad (38)$$

Substituting equations (37) and (38) into equation (36) and rewriting it in terms of non-dimensional variables gives us equation (39).

$$\langle v_r \rangle = \frac{1}{H-f}\int_f^H v_r dz \qquad (39)$$

$$= \frac{1}{3Ca}\frac{1}{1+\eta_{sp}}(H-f)^2\frac{\partial}{\partial r}\left(\frac{\partial^2 H}{\partial r^2} + \frac{1}{r}\frac{\partial H}{\partial r}\right)$$

Equations (30) and (32) may also be written taking the substrate into account as shown in equations (40) and (41). Equations (40) and (41) are formed by replacing some instances of the height of the droplet found in equations (30) and (31) with the height of the droplet above the substrate (H–f) and in some instances with the height of the droplet above the plane (H). In the context of the present application, both equations (40) and (41) may be considered lubrication type equations.

$$\frac{\partial H}{\partial t} = -\frac{1}{3Ca}\frac{1}{r}\frac{\partial}{\partial r}\left[\frac{r}{1+\eta_{sp}}(H-f)^3\frac{\partial}{\partial r}\left(\frac{\partial^2 H}{\partial r^2} + \frac{1}{r}\frac{\partial H}{\partial r}\right)\right] - EJ(r,t) \qquad (40)$$

$$\frac{\partial[(H-f)C]}{\partial t} = -\frac{1}{3Ca}\frac{1}{r}\frac{\partial}{\partial r}\left\{\frac{r}{1+\eta_{sp}}(H-f)^3\frac{\partial}{\partial r}\left[\frac{1}{r}\frac{\partial}{\partial r}\left(r\frac{\partial H}{\partial r}\right)\right]C\right\} + \frac{1}{r}\frac{\partial}{\partial r}\left[\frac{1}{Sc}r(H-f)\frac{\partial C}{\partial r}\right] \qquad (41)$$

Equation (41) may also be written in terms of a solute amount W, defined as the product of the concentration and the thickness of the droplet, W=(H–f)C, and the averaged radial velocity as shown in equation (42).

$$\frac{\partial W}{\partial t} = -\frac{1}{r}\frac{\partial}{\partial r}\{r\langle v_r \rangle W\} + \frac{1}{r}\frac{\partial}{\partial r}\left[\frac{1}{Sc}r(H-f)\frac{\partial(W/(H-f))}{\partial r}\right] \qquad (42)$$

The boundary conditions described in equations (34) and (35) may also be modified to take the non-flat substrate into account as shown in equations (43) and (44). As explained above the boundary conditions described by equation (44) are that the thickness of the droplet at the interface is zero and the total velocity of liquid at the droplet interface is zero thus implying that the contact line is not moving.

$$\left.\frac{\partial H}{\partial r}\right|_{r=0} = \left.\frac{\partial f}{\partial r}\right|_{r=0}, \qquad (43)$$
$$\left.\frac{\partial^3 H}{\partial r^3}\right|_{r=0} = \left.\frac{\partial^3 f}{\partial r^3}\right|_{r=0},$$
$$\left.\frac{\partial C}{\partial r}\right|_{r=0} = 0$$

$$H|_{r=1} = f|_{r=1}, \qquad (44)$$
$$(H-f)\langle v_r \rangle|_{r=1} = 0$$

In an embodiment of the present invention it may be useful to describe the boundary conditions in more general terms. A spatial vector $\vec{\xi}$ may be used to define the simulation space. As described above a variable H represents the height of the droplet above a plane. The droplet is defined as sitting on a substrate f. The variables H and f can be defined in terms of the spatial vector $\vec{\xi}$. In which case there is a contact line $\partial\Omega$ that represents one or more lines that describe the intersection of the droplet with substrate as described in equation (45), at which point the thickness of the droplet is zero.

$$\partial\Omega = \{\vec{\xi}\in\mathfrak{R}^3 : H(\vec{\epsilon},t) - f(\vec{\epsilon}) = 0\} \qquad (45)$$

Equation (46) is a generalized form of equation (44) multiplied by the concentration C. There is also a unit vector $\hat{n}$ that is orthogonal to the contact line $\partial\Omega$ Which in the specific case of an axially symmetric droplet centered on the origin of a cylindrical coordinate system would be parallel to a radial unit vector ($\hat{n}\cdot\hat{r}=1$). In the more general case equation (46) describes how the total velocity orthogonal to the interface at the interface and is zero unless the concentration of solute at the interface is zero. Under most realistic conditions the concentration (C) at the boundary is non-zero as solute gets deposited at the boundary. In other words since the contact line is pinned the fluid isn't moving and there is no diffusion flux across the contact line. The boundary condition described by equation (46) is relevant to the first term in equation (42).

$$\left.\left(\frac{(H-f)^3}{3Ca(1+\eta_{sp})}(\nabla\nabla^2 H)\cdot\hat{n}\right)C\right|_{\partial\Omega} = 0 \qquad (46)$$

In an embodiment of the present invention a boundary condition may be imposed requiring that the divergence of the concentration at the interface and perpendicular to the interface is zero as described by equation (47). In other words there is no movement of solute at the pinned contact line. The boundary condition described by equation (47) is relevant to the second term in equation (42).

$$\nabla C \cdot \hat{n}|_{\partial\Omega} = 0 \qquad (47)$$

Numerical Algorithm

In an embodiment of the present invention the set of coupled non-linear equations described in equations (40) and (42) are solved using a numerical method. Solving these equations using numerical methods can be difficult because the equations are stiff and include fourth order differential terms. Finding a stable and accurate method for solving stiff fourth order differential equations can be difficult and is dependent upon the form that the equations take.

Described below is a general numerical procedure that may be used to solve a pair of coupled non-linear equations. A first equation in the pair, equation (40), is a lubrication type evaporation equation that is representative of an approximation of the evaporation of a droplet on a non-flat substrate and its effect on the height profile of the droplet. A second equation in the pair, equation (42), is a lubrication type equation that is representative of the evolution of the concentration profile in the droplet and the approximate effect of diffusion in the droplet the motion of fluid in the droplet on the solute amount. In an embodiment of the present invention, the pair of equations is solved on a regular finite difference gird. In an alternative embodiment of the present invention, the pair of equations are solved on a non-regular grid. An individual skilled in the art will appreciate that modifications of the grid used in this method are still within the spirit and scope of the invention as described in the claims.

Figure 4:
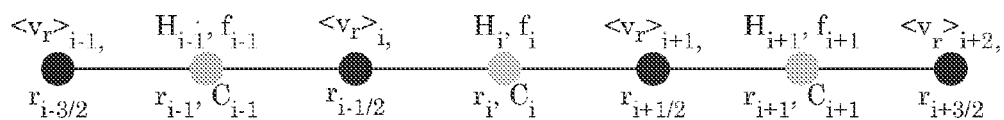
FIG. 4 illustrates a numerical finite difference grid set up along the computational domain [0, 1] utilized for the general numerical procedure in accordance with an embodiment of the invention.

FIG. 4 is an illustration of a portion of a finite difference grid that may be employed in an embodiment of the present invention. The normalized range of the computational spatial domain described by the finite difference grid may be [0, 1]. In an embodiment of the present invention a staggered grid may be employed. FIG. 4 is an illustration of a staggered grid in which the black dots represent cell edges and the gray dots represent cell centers. As shown in FIG. 4, the height H of the droplet, the height of the substrate f, the radius r, and the concentration C are calculated at the cell centers. The average velocities $\langle v_r \rangle$ and the radius r are calculated at the cell edges. The applicants have found that evaluating these variables at these spatial positions improves the stability of the simulation. An alternative embodiment of the present invention may include evaluating these variables at alternative spatial positions without going beyond the scope and spirit of the present invention as defined in the claims. The finite difference grid shown in FIG. 4 is along the radial axis of a cylindrical coordinate system. An individual skilled in the art will appreciate how to extend the present invention into other coordinate systems and along multiple axes and higher dimensions without going beyond the scope and spirit of the present invention as defined in the claims.

Discretization

The matrix operators M, N, and L as defined in equations (48), (59), and (61) are used to simplify the presentation of the numerical method, and are representative of parts of equations (40) and (42). The matrix operators M, N, and L are m×m matrices, wherein m is the number nodes in the simulation. The matrices $M_i$, $N_i$, $L_i$, H, f, J, and C are m×1 matrices that correspond to the identified variables. The matrix operators $M_i$, $N_i$, and $L_i$ may be thought of as differential operators. Each partial derivative operator may be written as vector with an index j. The matrix $M^n$ may be defined in terms of sub-matrices $M_i^n$ as described in equation (48).

$$M^n = \begin{bmatrix} M_1^n \\ \vdots \\ M_i^n \\ \vdots \\ M_m^n \end{bmatrix} \quad (48)$$

Each sub-matrix $M_i^n$ is a differential operator as described in equation (49). Equation (49) describes a matrix operator that includes calculating the height at a time step n and is applied to the height at time step n+1. The applicants have found that using the operator $M^n$ in this manner improves the stability of an embodiment of the present invention.

$$M_i^n H_i^{n+1} = -\frac{1}{3Ca} \frac{1}{r_i} \left[ \frac{\partial}{\partial r_i} \left( \frac{r}{1+\eta_{sp}^n} (H^n - f)^3 \frac{\partial}{\partial r} \left( \frac{\partial^2}{\partial r^2} + \frac{1}{r} \frac{\partial}{\partial r} \right) \right) \right] H_i^{n+1} \quad (49)$$

Each differential operator may be approximated with a finite difference operator such as the one described in equation (50). The half steps described in equation (50) coincide with the cell edges.

$$\frac{\partial}{\partial r_i}(\square) = \frac{\square_{i+\frac{1}{2}} - \square_{i-\frac{1}{2}}}{\Delta r_i} \quad (50)$$

The differential operator and the finite difference operators from equation (50) may be applied to a second differential operator such as the one described in equation (51).

$$\square = \frac{r}{1+\eta_{sp}^n} (H^n - f)^3 \frac{\partial}{\partial r} \left( \frac{\partial^2}{\partial r^2} + \frac{1}{r} \frac{\partial}{\partial r} \right) \quad (51)$$

When the finite difference operator is applied to the second differential operator in equation (51) a part of it may take the form of equation (52). An individual skilled in the art would appreciate how the backward half step in equation (50) may be calculated using the same methodology.

$$\square_{i+\frac{1}{2}} = \frac{r_{i+\frac{1}{2}}}{1+\eta_{sp_{i+\frac{1}{2}}}^n} \left( H_{i+\frac{1}{2}}^n - f_{i+\frac{1}{2}} \right)^3 \frac{\partial}{\partial r_{i+\frac{1}{2}}} \left( \frac{\partial^2}{\partial r^2} + \frac{1}{r} \frac{\partial}{\partial r} \right) \quad (52)$$

Equation (52) includes an additional differential operator that may also be approximated by an additional finite difference operator as described by equation (53).

$$\frac{\partial}{\partial r_{i+\frac{1}{2}}}(\square) = \frac{(\square)_{i+1} - (\square)_i}{\Delta r_i} \quad (53)$$

The operator used in equation (53) may be the second order differential operator described in equation (54).

$$\square = \frac{\partial^2}{\partial r^2} + \frac{1}{r} \frac{\partial}{\partial r} \quad (54)$$

Equation (55) describes the result of applied the finite difference form of the operator from equation (54).

$$\square_i H_i^{n+1} = \frac{H_{i+1}^{n+1} - 2H_i^{n+1} + H_{i-1}^{n+1}}{(\Delta r_i)^2} + \frac{1}{r_i} \frac{H_{i+1}^{n+1} - H_{i-1}^{n+1}}{2\Delta r_i} \quad (55)$$

As described in equations (50), (53), and (55) each partial derivative may approximated with a finite difference approximation such as a second order Taylor expansion. The Taylor expansion may be a forward expansion, backward expansion or a central difference expansion. An individual skilled in the art will appreciate that other treatments of the derivatives may be used with out going beyond the spirit and scope of the present invention.

Equation (40) may be written in terms of equation (49) as in equation (56) and solved for $H^{n+1}$ such that that a new height may be found at a new time step. Equation (56) is a semi-implicit evolution equation that describes the evolution of the height of the droplet. Please note that the matrix M is multiplied by the matrix H at the time step n+1 instead of the time step n, the applicants have found that doing so improves stability. Please also note that the matrix M is evaluated at time step n.

$$\frac{H^{n+1} - H^n}{\Delta t} = M^n H^{n+1} - EJ^n \quad (56)$$

$$[I - \Delta t M^n] H^{n+1} = H^n - \Delta t EJ^n$$

The evaporation rate as used in equation (50) may be described using the Ozawa model as in equation (57) in which $C_g$ is the gelation concentration for the solute. The variable $J_0$ is the initial evaporation rate. $J_0$ may be a constant or may be a spatial function.

$$J^n(r, t) = J_0 \left[ 1 - \frac{C^n(r, t)}{C_g} \right] \quad (57)$$

Equation (42) may be written as finite difference matrix equation (58). In which the matrices L and N are defined in equations (59) and (61).

$$\frac{W^{n+1} - W^n}{\Delta t} = (L^{n+1} + N^{n+1}) W^{n+1} \quad (58)$$

$$[I - \Delta t(L^{n+1} + N^{n+1})] W^{n+1} = W^n$$

Equation (58) is an evolution equation that can be used to determine the solute amount at a future time step based on the solute amount at a past time step and state of the droplet, including the height profile, the velocity profile and other variables that describe the state of the droplet at the future time step. The matrix $N^n$ is a differential operator that is an approximate description of the effect of diffusion on the solute amount and the concentration of solute.

$$N^n = \begin{bmatrix} N_1^n \\ \vdots \\ N_i^n \\ \vdots \\ N_m^n \end{bmatrix} \quad (59)$$

Each sub-matrix $N_i^n$ a differential operator as described in equation (60). The differential operators described in equation (60) are operating on the solute amount W.

$$N_i^{n+1} W_i^{n+1} = \frac{1}{r_i} \frac{\partial}{\partial r_i} \left( \frac{1}{Sc} r(H^{n+1} - f) \frac{\partial \left( \frac{1}{H^{n+1} - f} \right)}{\partial r} \right) W_i^{n+1} \quad (60)$$

In an embodiment of the present invention it may be assumed that the liquid inside the droplet is moving. The effect of convection on the concentration profile C and on the solute amount W may be approximated with the differential matrix operator $L^n$, as described by equations (61) and (62).

$$L^n = \begin{bmatrix} L_1^n \\ \vdots \\ L_i^n \\ \vdots \\ L_m^n \end{bmatrix} \quad (61)$$

Each sub-matrix $L_i^n$ a differential operator as described in equation (62).

$$L_i^{n+1} W_i^{n+1} = -\frac{1}{r_i} \frac{\partial}{\partial r_i} (r_i \langle v_r \rangle_i^{n+1}) W_i^{n+1} \quad (62)$$

$$= -\left[ \frac{1}{r} \frac{\partial}{\partial r} \left( \frac{r}{3Ca} \frac{(W/C)^2 W}{1 + \eta_{sp}} \frac{\partial}{\partial r} \left( \frac{\partial^2 H}{\partial r^2} + \frac{1}{r} \frac{\partial H}{\partial r} \right) \right) \right]_i^{n+1}$$

The results of equations (60) and 62) may be used along with equation (58) to calculate a new concentration profile $C^{n+1}$ from the solute amount $W^{n+1}$.

In an embodiment of the present invention the concentration C is defined at the cell centers, the same location as H, r, and f as illustrated in FIG. 4. Equations (63)-(66) describe how second order expansions of the spatial derivatives in the diffusion term may be evaluated. Equation (63) describes how a first spatial derivative may be evaluated using a centered differencing method.

$$N_i^{n+1} W_i^{n+1} = \left[ \frac{1}{r} \frac{\partial}{\partial r} \left( \frac{1}{Sc} r \left( \frac{W^{n+1}}{C^{n+1}} \right) \frac{\partial \frac{1}{H^{n+1} - f}}{\partial r} \right) \right]_i W_i^{n+1} \quad (63)$$

$$= \frac{1}{Sc} \frac{\left[ r(H^{n+1} - f) \frac{\partial C^{n+1}}{\partial r} \right]_{i+\frac{1}{2}} - \left[ r(H^{n+1} - f) \frac{\partial C^{n+1}}{\partial r} \right]_{i-\frac{1}{2}}}{r_i \Delta r}$$

Equations (64) describe how each half step in equation (63) is evaluated, the spatial derivate of the concentration which is nested in the first derivate may be evaluated using a centered difference method.

$$\left[ r(H^{n+1} - f) \frac{\partial C^{n+1}}{\partial r} \right]_{i+\frac{1}{2}} = r_{i+\frac{1}{2}} \left( \frac{H_i^{n+1} + H_{i+1}^{n+1}}{2} - f_{i+\frac{1}{2}} \right) \frac{C_{i+1}^{n+1} - C_i^{n+1}}{\Delta r} \quad (64)$$

$$\left[ r(H^{n+1} - f) \frac{\partial C^{n+1}}{\partial r} \right]_{i-\frac{1}{2}} = r_{i-\frac{1}{2}} \left( \frac{H_i^{n+1} + H_{i-1}^{n+1}}{2} - f_{i-\frac{1}{2}} \right) \frac{C_i^{n+1} - C_{i-1}^{n+1}}{\Delta r}$$

Equations (65) and (66) describe how the spatial dimension r may be defined in terms of the of the grid size $\Delta r$, when the grid size is uniform. An individual skilled in the art will appreciate how this may be adapted to a non-uniform grid without going beyond the scope and spirit of the present invention.

$$r_i = \left(i - \frac{1}{2}\right)\Delta r \quad (65)$$

$$r_{i+\frac{1}{2}} = i\Delta r \quad (66)$$

The convection term as used in equations (61) and (62) may be discretized using second order approximations of the spatial derivatives as described in equations (67)-(72). The variable $\langle v_r \rangle$ is evaluated at the cell edges, while the concentration C, the radius r, and the height H are evaluated at the cell centers, as shown in FIG. 4. For terms that involve the product of a cell centered value and a cell edge value, the cell edge values $\langle v_r \rangle$ are averaged to calculate the cell center values as shown in equation (67). The differential of the product $\langle v_r \rangle$ W is approximated using a centered finite difference method, which is also described by equation (67).

$$L_i^{n+1} W_i^{n+1} = \left[-\frac{1}{r}\frac{\partial}{\partial r}(r\langle v_r \rangle^{n+1})\right]_i W_i^{n+1} \quad (67)$$

$$= \left[-\frac{1}{r}\langle v_r \rangle^{n+1} - \frac{\partial}{\partial r}(\langle v_r \rangle^{n+1})\right]_i W_i^{n+1}$$

$$= -\frac{\frac{\langle v_r \rangle_i^{n+1} + \langle v_r \rangle_{i+1}^{n+1}}{2} W_i^{n+1}}{r_i} - \frac{[\langle v_r \rangle^{n+1} W^{n+1}]_{i+1} - [\langle v_r \rangle^{n+1} W^{n+1}]_{i-1}}{2\Delta r}$$

As described above when the product of $\langle v_r \rangle$ W is evaluated at a cell centered node, neighboring cell edge values are averaged together to obtain a cell centered value for the $\langle v_r \rangle$ as shown in equation (68).

$$(\langle v_r \rangle^{n+1} W^{n+1})_{i+1} = \frac{\langle v_r \rangle_{i+1}^{n+1} + \langle v_r \rangle_{i+2}^{n+1}}{2} W_{i+1}^{n+1} \quad (68)$$

The average radial velocity $\langle v_r \rangle$ is calculated at the cell edge based on cell centered values as shown in equation (69). The height H is calculated at the cell edge by taking a local average of cell centered values as shown in equation (69). The specific viscosity $\eta_p$ may be calculated based on the Ozawa model as shown in equation (17) or based on experimental data such as in FIG. 2. The differential of the Laplacian may be approximated by centered difference function of the Laplacian that is cell centered.

$$\langle v_r \rangle_{i+1}^{n+1} = \frac{1}{3Ca}\frac{1}{1 + [\eta_{sp}^n]_{i+1}}\left(\frac{H_i^{n+1} + H_{i+1}^{n+1}}{2} - f_{i+\frac{1}{2}}\right)^2 \times \quad (69)$$

$$\frac{\left(\frac{\partial^2 H}{\partial r^2} + \frac{1}{r}\frac{\partial H}{\partial r}\right)_{i+1}^{n+1} - \left(\frac{\partial^2 H}{\partial r^2} + \frac{1}{r}\frac{\partial H}{\partial r}\right)_i^{n+1}}{\Delta r}$$

Equation (70) describes how a radial portion of a Laplacian of the height of the droplet above a plane may be evaluated at cell edges using cell centered values of the height of the droplet above a plane using the centered difference method.

$$\left(\frac{\partial^2 H}{\partial r^2} + \frac{1}{r}\frac{\partial H}{\partial r}\right)_{i+1}^{n+1} = \frac{H_{i+2}^{n+1} - 2H_{i+1}^{n+1} + H_i^{n+1}}{\Delta r^2} + \frac{H_{i+2}^{n+1} - H_i^{n+1}}{2r_{i+1}\Delta r} \quad (70)$$

As in equations (65) and (66) equations (71) and (72) describe how the spatial dimension r may be defined in terms of the of the grid size $\Delta r$, when the grid size is uniform. An individual skilled in the art will appreciate how this may be adapted to a non-uniform grid without going beyond the scope and spirit of the present invention $$r_{i+1} = \left(i + \frac{1}{2}\right)\Delta r \quad (71)$$

$$r_{i+\frac{3}{2}} = (i + 1)\Delta r \quad (72)$$

Upwind Algorithm for Small or No Diffusion

An embodiment of the invention described above is useful for simulating the evaporation of a droplet with a wide array of simulation variables. As the inverse of the dimensionless Schmidt like number 1/Sc approaches zero, i.e. less than 0.0001, an embodiment of the invention described above may provide unstable results and be ineffective at simulating the evaporation of a droplet. These unstable results may take the form of oscillations, and may occur in the later stages of the evaporation when the solute concentration C is approaching the gelation concentration $C_g$. In an embodiment of the present invention it may be desirable to ignore the effect of diffusion, such that the inverse of the dimensionless Schmidt like number is assumed to be zero, 1/Sc=0.

As noted the method described above does not provide stable results when the inverse of the dimensionless Schmidt like number is zero or less than or equal to 0.0001. The applicants have found that using an upwind type method to evaluate specific terms in the governing equations can produce stable results even when the inverse of the dimensionless Schmidt like number is equal to or close to zero. The present invention may be distinguished from traditional upwind methods in that a velocity which is used to determine the differencing method used to approximate the differential is also a term in the differential being approximated. The present invention may also be distinguished from traditional upwind methods in that only particular terms are evaluated using the upwind type method.

The following describes an adaptation of the numerical procedure described above to solve the droplet evaporation equation (40) and solute movement, diffusion, lubrication equation (42).

A method for solving the fluid flow problem using the present invention may include some of the following steps.

One step may include calculating the concentration C" at a time step n based on the solute amount W" using equation (73).

$$C^n = \frac{W^n}{H^n - f} \quad (73)$$

A further step may include solving the lubrication equation (56) for the height H of the droplet above a plane at a time step n+1. In one embodiment of the present invention the evaporation rate J may be calculated using equation (74) based on the concentration C calculated in equation (73). An individual skilled in the art will appreciate that other methods based on experimental data or alternative theories may be used to calculate the evaporation rate without going beyond the spirit and scope of the present invention.

An individual skilled in the art will appreciate that a derivative of a first function with respect to a first variable may be approximated with a finite difference method. The finite difference method includes evaluating the first function at two or more values of the first variable and dividing by a distance between the two or more values of the first variable. The finite difference method may come in many forms and many orders of approximation. A second order approximation may include evaluating the first function at two values of the first variable, such as a central difference method, a forward difference method, a backward difference method, and other difference methods.

The upwind method as used in the prior art may be described with respect to an exemplary differential equation ($\partial a/\partial t = b \partial a/\partial x$). This exemplary equation describes the rate of change of a first function (a) relative to a temporal variable (t) to the rate of change of the first function (a) relative to a spatial variable (x) mediated by a rate variable (b). The finite difference method when applied to the exemplary differential equation includes approximating the differentials with difference equations. In the upwind method the type of finite difference method used is dependent upon sign of the rate variable (b). For example when the rate variable (b) is positive the backward difference method is used, and when the rate variable (b) is negative the forward difference method is used. There can be variations on this method but one feature of the upwind method described in the prior art is that the rate variable used to make a decision is not a part of the differential.

Equation (74) describes how a component $L_i$ of the intermediate matrix L might be evaluated at a time step n+1 using the present invention as opposed to the central differencing method described in equation (67).

$$L_i^{n+1} W_i^{n+1} = -\left[\frac{1}{r}\frac{\partial}{\partial r}(r\langle v_r\rangle^{n+1} W^{n+1})\right]_i \quad (74)$$

$$= \begin{cases} -\dfrac{r_i \langle v_r\rangle_i^{n+1} W_i^{n+1} - r_{i-1}\langle v_r\rangle_{i-1}^{n+1} W_{i-1}^{n+1}}{r_{i-\frac{1}{2}}\Delta r} & \langle v_r\rangle_i^{n+1} > 0 \\ -\dfrac{r_{i+1}\langle v_r\rangle_{i+1}^{n+1} W_{i+1}^{n+1} - r_i\langle v_r\rangle_i^{n+1} W_i^{n+1}}{r_{i+\frac{1}{2}}\Delta r} & \langle v_r\rangle_i^{n+1} \le 0 \end{cases}$$

Figure 5A:
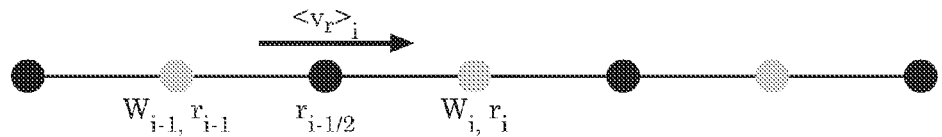
FIGS. 5A-D are illustrations of a finite difference grid and the relative positions of various variables.
Figure 5B:
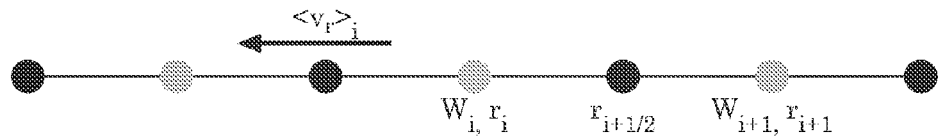
Figure 5C:
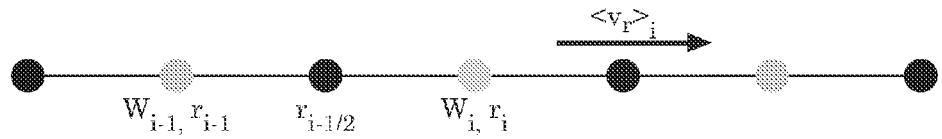
Figure 5D:
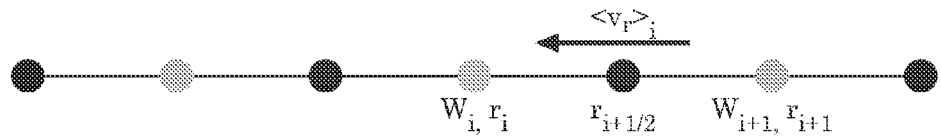

Equation (74) also shows how each term in the component $L_i$ is evaluated depending on the direction of the averaged radial velocity $\langle v_r\rangle$. As shown in equation (74) when the averaged radial velocity is positive a backward differencing procedure is used to evaluate the differential of the product of the radius (r), the average radial velocity $\langle v_r\rangle$, the concentration (C), and the thickness (H-f) of the film. FIG. 5A is an illustration of the relative positions of the variables used in calculating the component $L_i$ when a backward differencing procedure is used. Also as shown in equation (74), when the averaged radial velocity is negative a forward differencing procedure is used to evaluate the differential of the product of the radius (r), the average radial velocity $\langle v_r\rangle$, the concentration (C), and the thickness (H-f) of the film. In the context of the present application a positive velocity is away from the center of the droplet, while a negative velocity is towards the center of the droplet. FIG. 5B is an illustration of the relative positions of the variables used in calculating the component $L_i$ when a forward differencing procedure is used. FIGS. 5C and 5D are illustrations of the relative positions of variables used in calculating the component $L_i$ in an alternative embodiment of the present invention in which the relative position of the cell edge value to the cell center value has been shifted.

Figure 6:
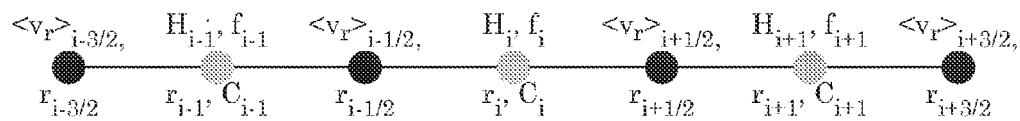
FIG. 6 illustrates a numerical finite difference grid set up along the computational domain [0, 1] utilized for the general numerical procedure in accordance with an embodiment of the invention.

As illustrated in FIGS. 5A-5D the spatial index (i), used to identify the position at which the averaged radial velocity $\langle v_r\rangle$ is calculated, is offset from the spatial index used to identify where all the other variables are calculated. In an alternative representation, a uniform spatial index (i) is used to represent all of the variables including the averaged radial velocity $\langle v_r\rangle$. The averaged radial velocity $\langle v_r\rangle$ is still calculated at the cell edges but a ½ offset index is used to represent that position instead of a separate index. FIG. 6 is an illustration of a portion of a finite difference grid using a uniform spatial index that may be employed in an embodiment of the present invention similar to the grid illustrated in FIG. 4. As shown in FIG. 6 when compared to FIG. 4 all the variables are calculated in the same positions, but the index of the averaged radial velocity $\langle v_r\rangle$ is consistent with the other variables. The choice of a uniform spatial grid or a set of grids offset from each other is arbitrary, does not affect the scope and spirit of the present invention, and is done in an effort to provide a clearer presentation of the invention.

Figure 7:
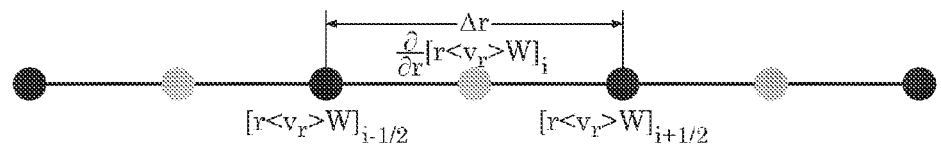
FIG. 7 illustrates the relative spatial locations of particular variables used in the evaluation of a finite difference function.

The alternative representation of the variables may be used to represent how the components $L_i$ of the intermediate matrix L may be written as a centered difference equation as stated in equation (75) as illustrated in FIG. 7.

$$L_i^{n+1} W_i^{n+1} = -\left[\frac{1}{r}\frac{\partial}{\partial r}(r\langle v_r\rangle^{n+1} W^{n+1})\right]_i \quad (75)$$

$$= -\frac{1}{r_i \Delta r}\left([r\langle v_r\rangle^{n+1} W^{n+1}]_{i+\frac{1}{2}} - [r\langle u\rangle^{n+1} W^{n+1}]_{i-\frac{1}{2}}\right)$$

In general terms, equation (75) describes how the solute amount W is effected by the motion of the fluid at a particular node (i), which is at a cell center, at a particular time (n+1) as a function of a difference between a first function evaluated at two points surrounding the particular node. In an embodiment of the present invention, the two points at which the first function is evaluated are half the distance between the particular node and the closest node (i+½, i-½). The first function may be described in terms of a function of the radial velocity and the solute amount. In an embodiment of the present invention the first function is $r\langle v_r\rangle W$. In an embodiment of the present invention the first function is a function of a spatial variable, the velocity of the fluid, the concentration of the fluid, and the thickness of the droplet.

In an embodiment of the present invention a portion of equation (75) may be evaluated using an upwind type method as described by equations (76) and (77). This upwind type method may be distinguished from the upwind method in that the both the sign of the velocity term and the sign of the index offset in the difference equation are used to determine the indexes used in the calculation.

$$(r\langle v_r\rangle^{n+1} W^{n+1})_{i+\frac{1}{2}} = \begin{cases} r_{i-\frac{1}{2}}\langle v_r\rangle_{i+\frac{1}{2}}^{n+1} W_i^{n+1} & \text{if } \langle v_r\rangle_{i+\frac{1}{2}}^{n+1} \ge 0 \\ r_{i+\frac{1}{2}}\langle v_r\rangle_{i+\frac{1}{2}}^{n+1} W_{i+1}^{n+1} & \text{if } \langle v_r\rangle_{i+\frac{1}{2}}^{n+1} < 0 \end{cases} \quad (76)$$

$$(r\langle v_r\rangle^{n+1}W^{n+1})_{i-\frac{1}{2}} = \begin{cases} r_{i-\frac{1}{2}}\langle v_r\rangle^{n+1}_{i-\frac{1}{2}}W^{n+1}_{i-1} & \text{if } \langle v_r\rangle^{n+1}_{i-\frac{1}{2}} \geq 0 \\ r_{i-\frac{1}{2}}\langle v_r\rangle^{n+1}_{i-\frac{1}{2}}W^{n+1}_{i} & \text{if } \langle v_r\rangle^{n+1}_{i-\frac{1}{2}} < 0 \end{cases} \quad (77)$$

In general terms the differential of the first function is evaluated at a first point in space (i) using a central difference finite difference approximation with a particular spacing ($\Delta r$) that evaluates the difference between the first function evaluated at a second point in space (i+½) and the first function evaluated at a third point in space (i−½) as shown in FIG. 7 and described by equation (75).

Figure 8A:
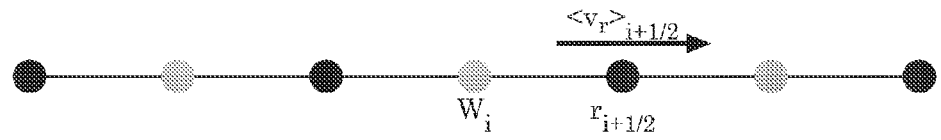
FIGS. 8A-D are illustrations of a finite difference grid and the relative positions of various variables.

Evaluating the first function at the second point (i+½) in space includes determining the sign of the averaged radial velocity $\langle v_r\rangle$ at the second point (i+½) in space. If the averaged radial velocity at the second point (i+½) in space is positive then the first function at the second point (i+½) in space is evaluated as the product of the averaged radial velocity $\langle v_r\rangle$ at the second point (i+½) in space, the spatial variable at the second point (i+½) in space, and the solute amount (W) at the first point (i) in space, as illustrated in FIG. 8A.

Figure 8B:
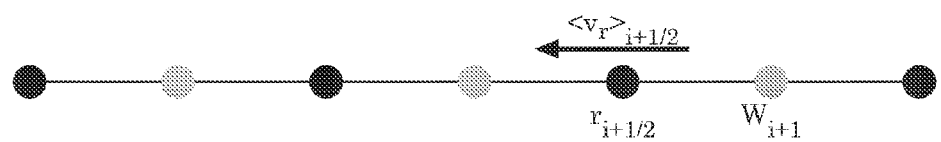

If the averaged radial velocity at the second point (i+½) in space is negative then the first function at the second point (i+½) in space is evaluated as the product of the averaged radial velocity $\langle v_r\rangle$ at the second point (i+½) in space, the spatial variable at the second point (i+½) in space and the solute amount (W) at a fourth point (i+1) in space, as illustrated in FIG. 8B.

Figure 8C:
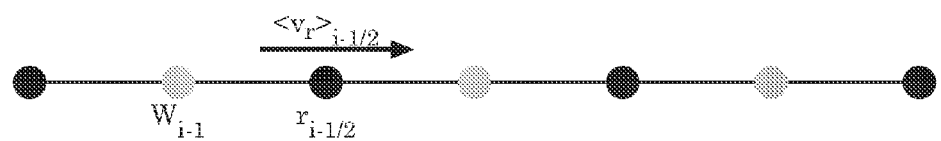

Evaluating the first function at the third point (i−½) in space includes determining the sign of the averaged radial velocity $\langle v_r\rangle$ at the third point (i−½) in space. If the averaged radial velocity at the third point (i−½) in space is positive then the first function at the third point (i−½) in space is evaluated as the product of the averaged radial velocity $\langle v_r\rangle$ at the third point in space (i−½), the spatial variable at the third point (i−½) in space and the solute amount (W) at the fifth point in space (i−1), as illustrated in FIG. 8C.

Figure 8D:
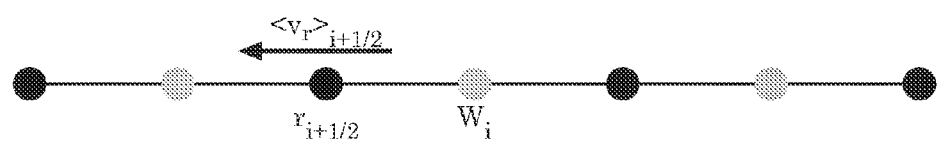

If the averaged radial velocity at the third point (i−½) in space is negative then the first function at the third point (i−½) in space is evaluated as the product of the averaged radial velocity $\langle v_r\rangle$ at the third point (i−½) in space, the spatial variable at the third point (i−½) in space and the solute amount (W) at a first point (i) in space, as illustrated in FIG. 8D.

In an embodiment of the present invention, the distance between the first point (i) in space and the second point (i+½) in space is half the particular spacing ($\Delta r/2$). In an embodiment of the present invention, the distance between the first point (i) in space and the third point (i−½) in space is half the particular spacing ($\Delta r/2$).

In an embodiment of the present invention, the distance between the first point (i) in space and the fourth point (i+1) in space is the particular spacing ($\Delta r$). In an embodiment of the present invention, the distance between the first point (i) in space and the fifth point (i−1) in space is the particular spacing ($\Delta r$).

In an embodiment of the present invention, the second (i+½) and fourth (i+1) points are a positive distance from the first point (i) in space. In an embodiment of the present invention, the third (i−½) and fifth (i−1) points are on a negative distance from the first point (i) in space.

In an embodiment of the present invention the spatial distance is radial distance in a cylindrical coordinate system. An individual skilled in the art will appreciate how to adapt the present invention to other coordinate systems.

In an embodiment of the present invention the spacing ($\Delta r$) is consistent throughout the simulation space. In an alternative embodiment of the present invention the spacing ($\Delta r_i$) is a function of the spatial coordinates. An individual skilled in the art will appreciate how to adapt the present invention to a non-uniform grid.

In an alternative embodiment of the present invention, the first function is a product of the averaged radial velocity and the solute amount. An individual skilled in the art will appreciate how to adapt the present invention by evaluating the first function as product only of the averaged radial velocity and the solute amount.

Results

Figure 9A:
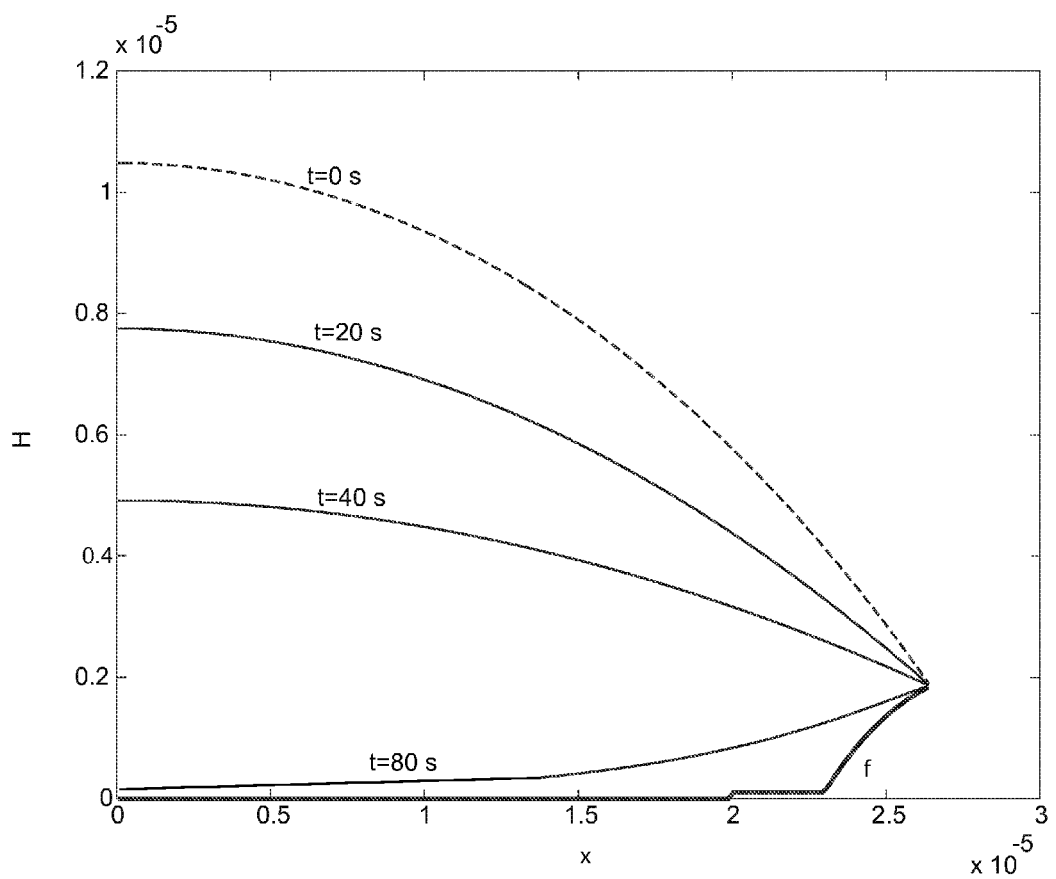
FIGS. 9A-D are graphical illustrations showing that as the droplet evaporates over time, and the solute gradually moves toward the contact line region, a higher concentration of solute accumulates near the contact region.
Figure 9B:
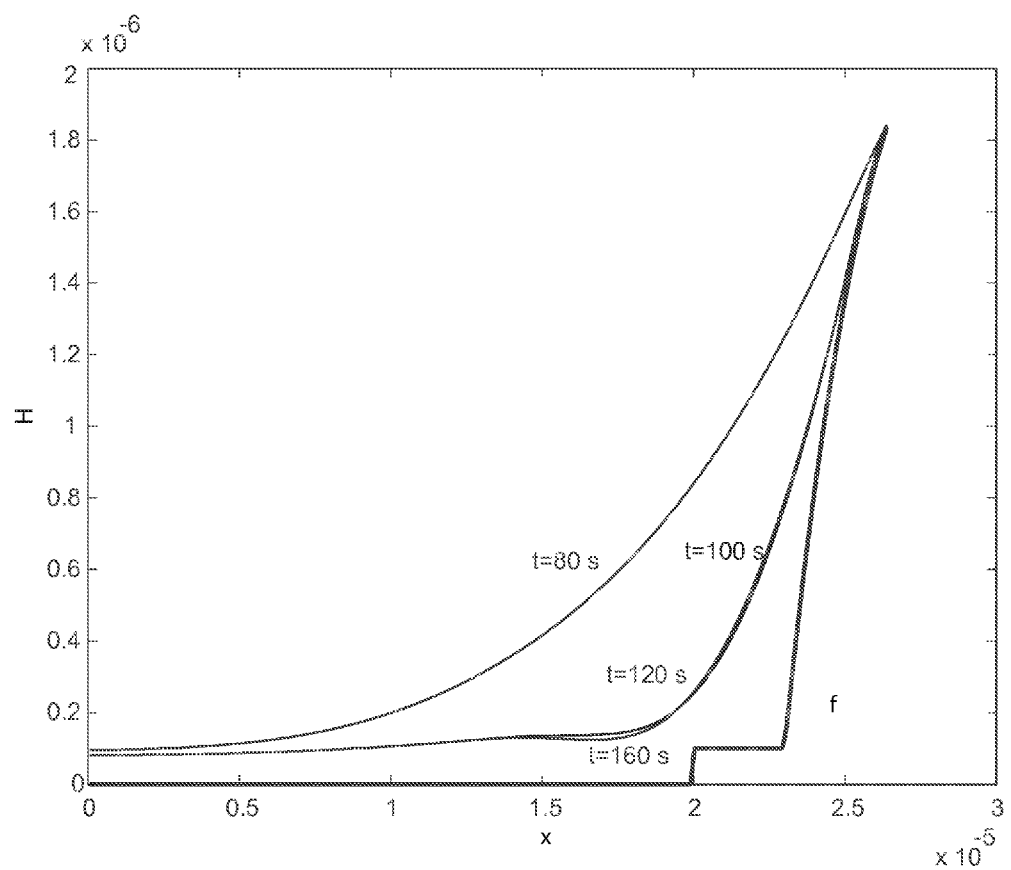
Figure 9C:
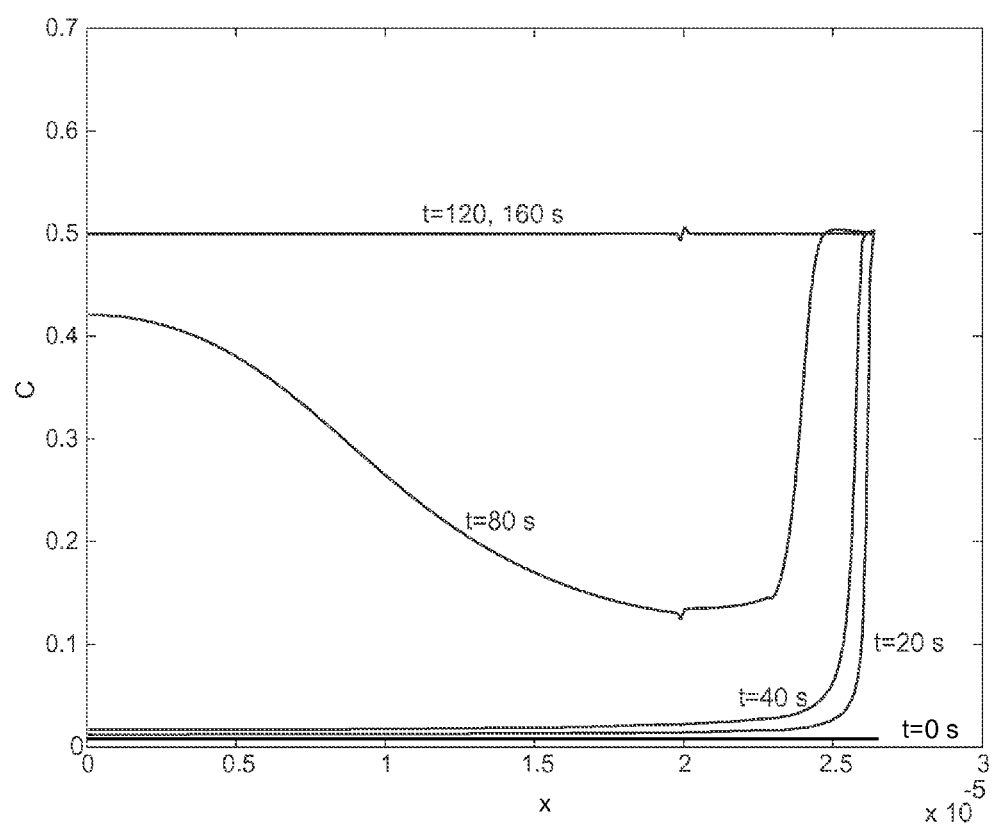
Figure 9D:
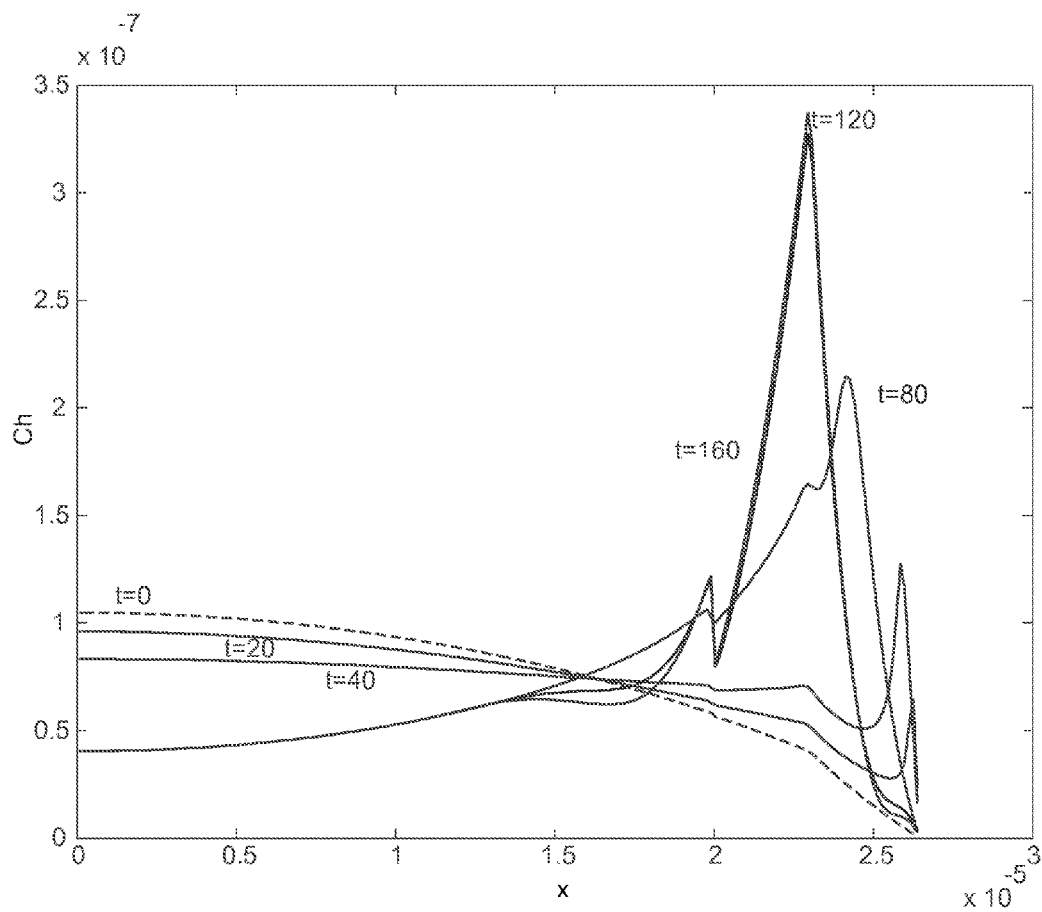

FIGS. 9A-B are simulation results of an embodiment of the present invention that illustrate the evolution over time of a droplet profile using a Cartesian coordinate system in which the droplet profile is assumed to be dependent upon the x-axis and independent of a second y-axis. As shown in FIG. 9A, at t=0 the droplet initially assumes a spherical shape over the non-flat substrate f. FIG. 9C is a simulation result of an embodiment of the present invention that illustrates the evolution over time of the solute concentration. The small variation in the concentration (C) at 2E-5 coincides with the location of the step in the substrate and is an artifact of the simulation. FIG. 9D is a simulation result of an embodiment of the present invention that illustrates the evolution over time of the product of the solute concentration and the height of the droplet above the substrate. The simulation results from FIGS. 9A-D are based on a numerical simulation in which: the inverse of the Schmidt like number is zero (1/Sc=0); the specific viscosity η is based on experimental data such as that shown in FIG. 2; and the droplet is resting on a non-flat substrate.

Figure 10A:
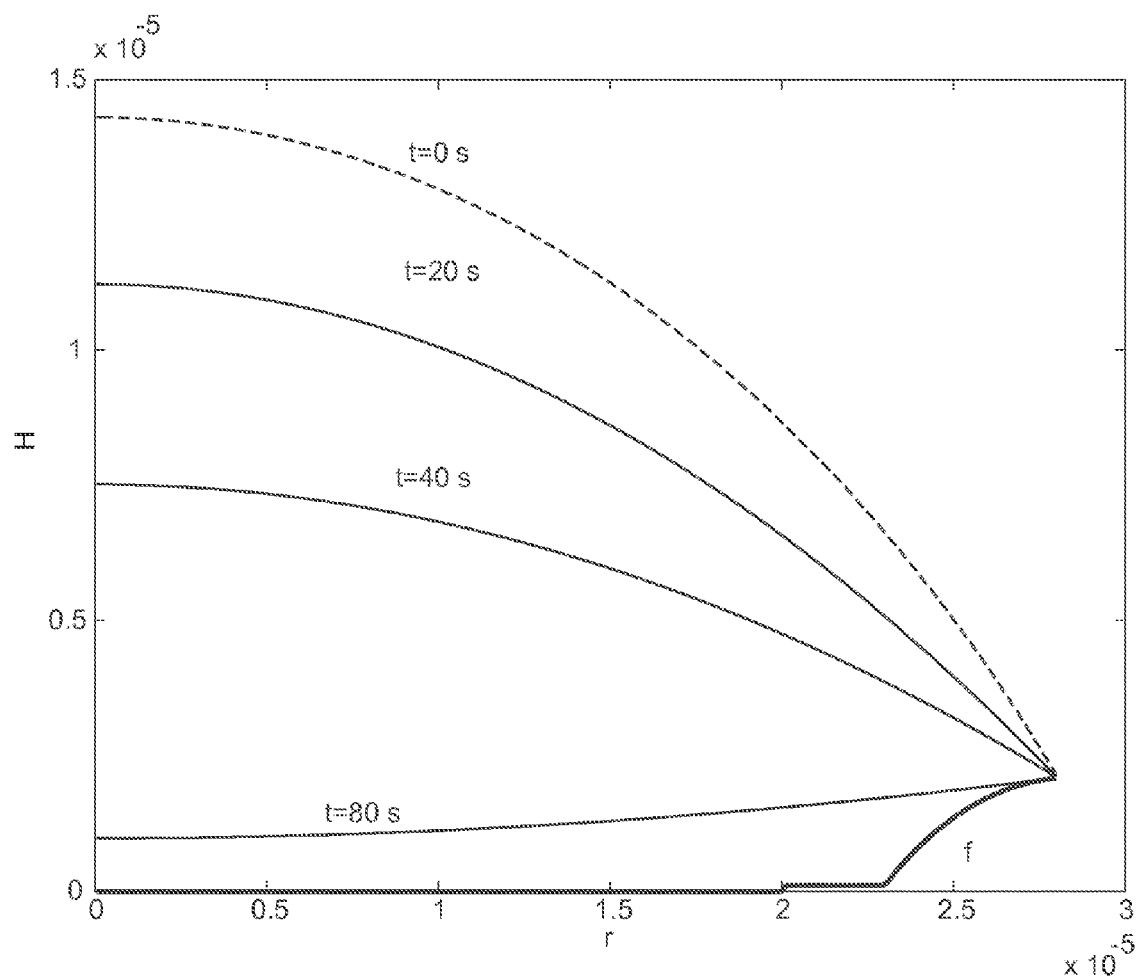
FIGS. 10A-D are graphical illustrations showing that as the droplet evaporates over time, and the solute gradually moves toward the contact line region, a higher concentration of solute accumulates near the contact region.
Figure 10B:
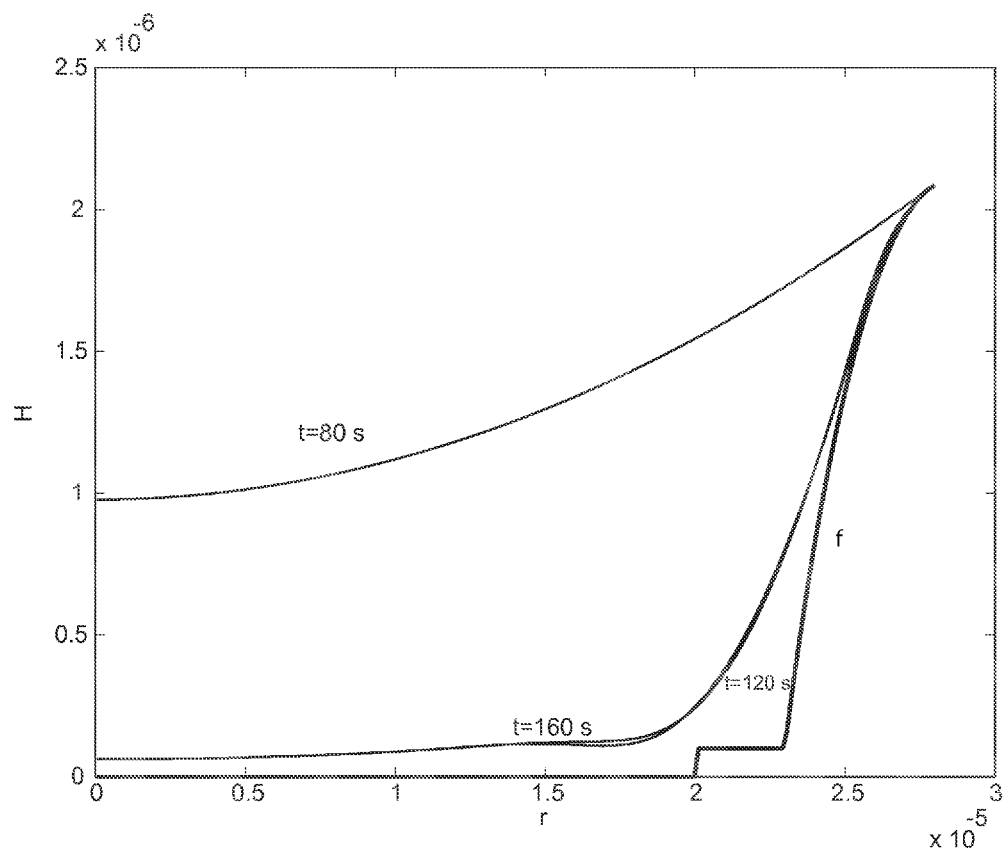
Figure 10C:
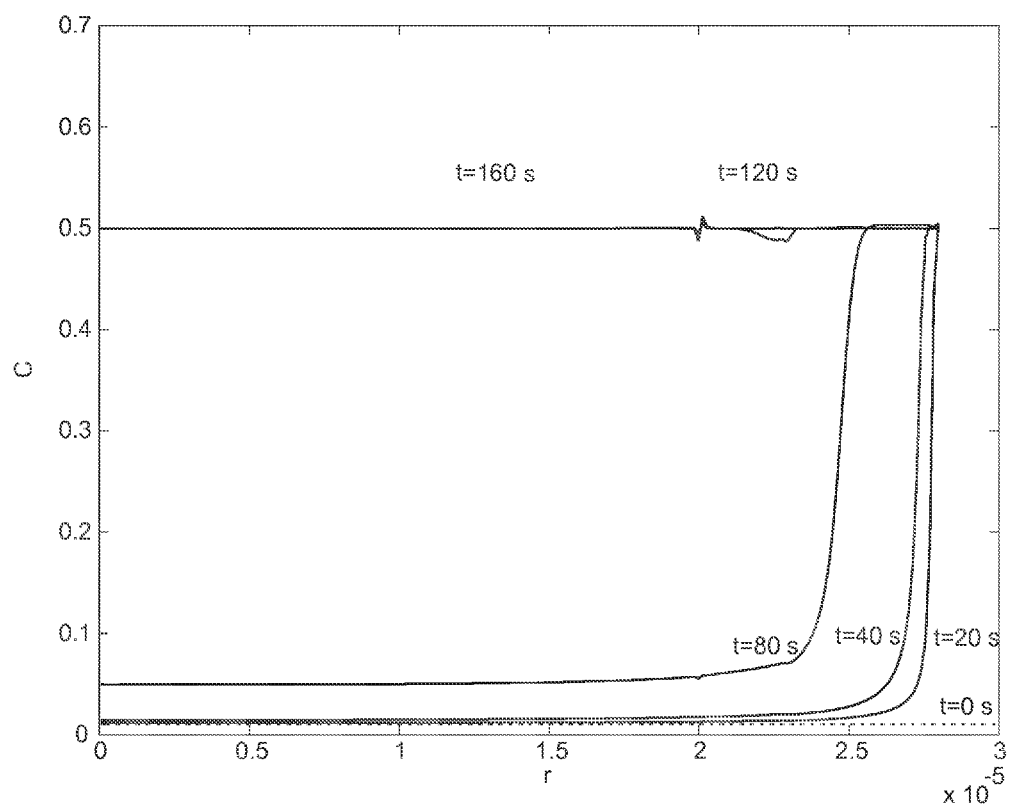
Figure 10D:
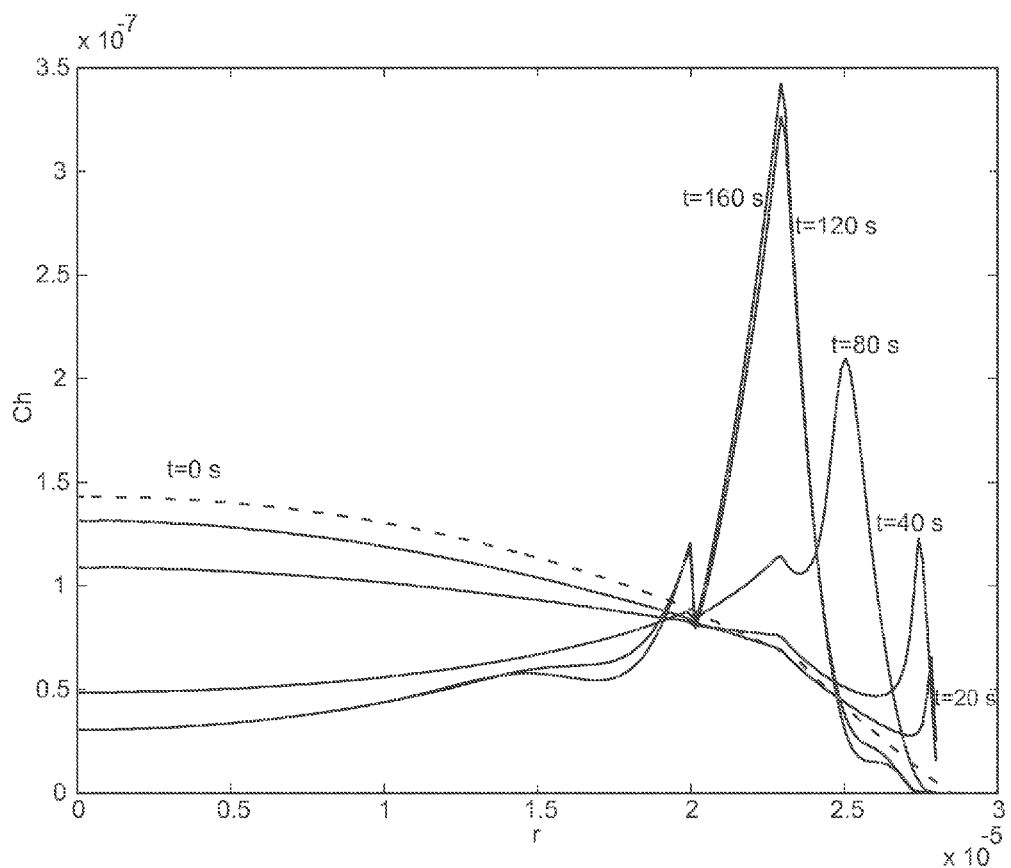

FIGS. 10A-B are additional simulation results of an embodiment of the present invention that illustrate the evolution over time of a droplet profile using a cylindrical coordinate system in which the droplet profile is assumed to be dependent upon the radius and independent of the azimuth. FIG. 10C is a simulation result of an embodiment of the present invention that illustrates the evolution over time of the solute concentration. FIG. 10D is an additional simulation result of an embodiment of the present invention that illustrates the evolution over time of the product of the solute concentration and the height of the droplet above the substrate. The simulation results from FIGS. 10A-D are based on a numerical simulation in which: the inverse of the Schmidt like number is zero (1/Sc=0); the specific viscosity η is based on experimental data such as that shown in FIG. 2; and the droplet is resting on a non-flat substrate.

Figure 11A:
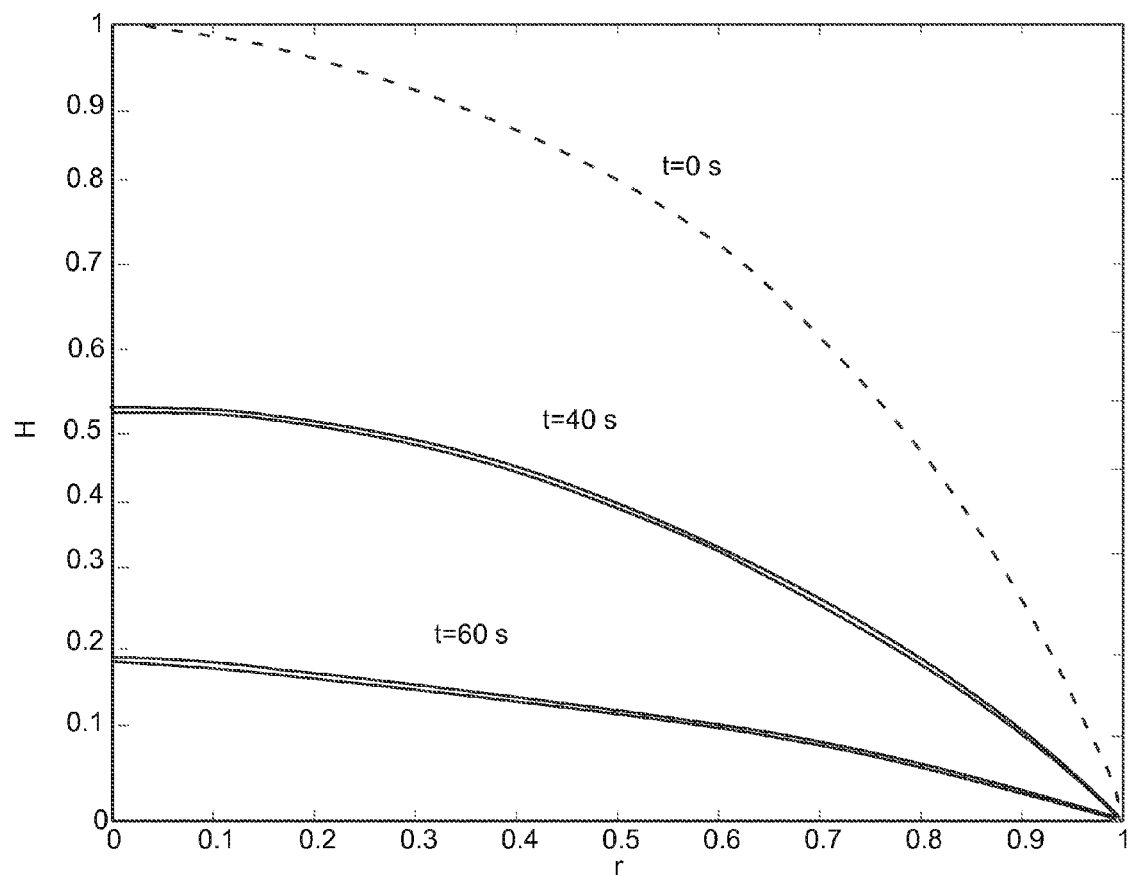
FIGS. 11A-C are graphical illustrations of simulations of the droplet evaporating on a flat substrate.
Figure 11B:
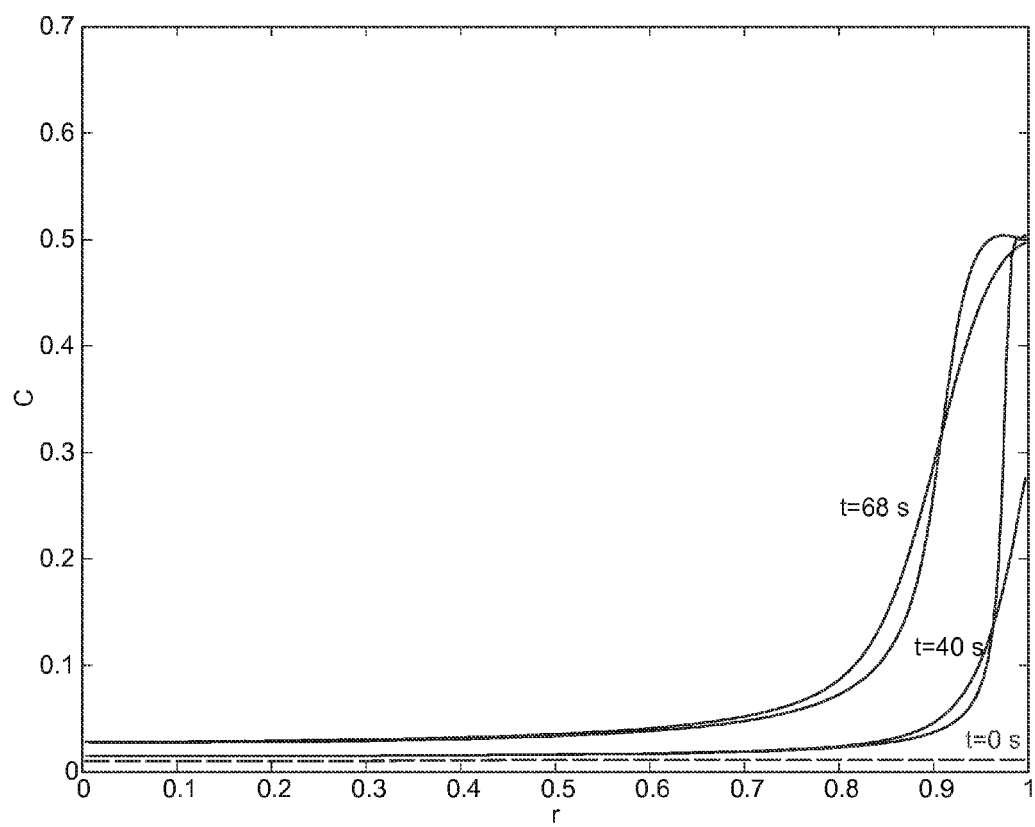
Figure 11C:
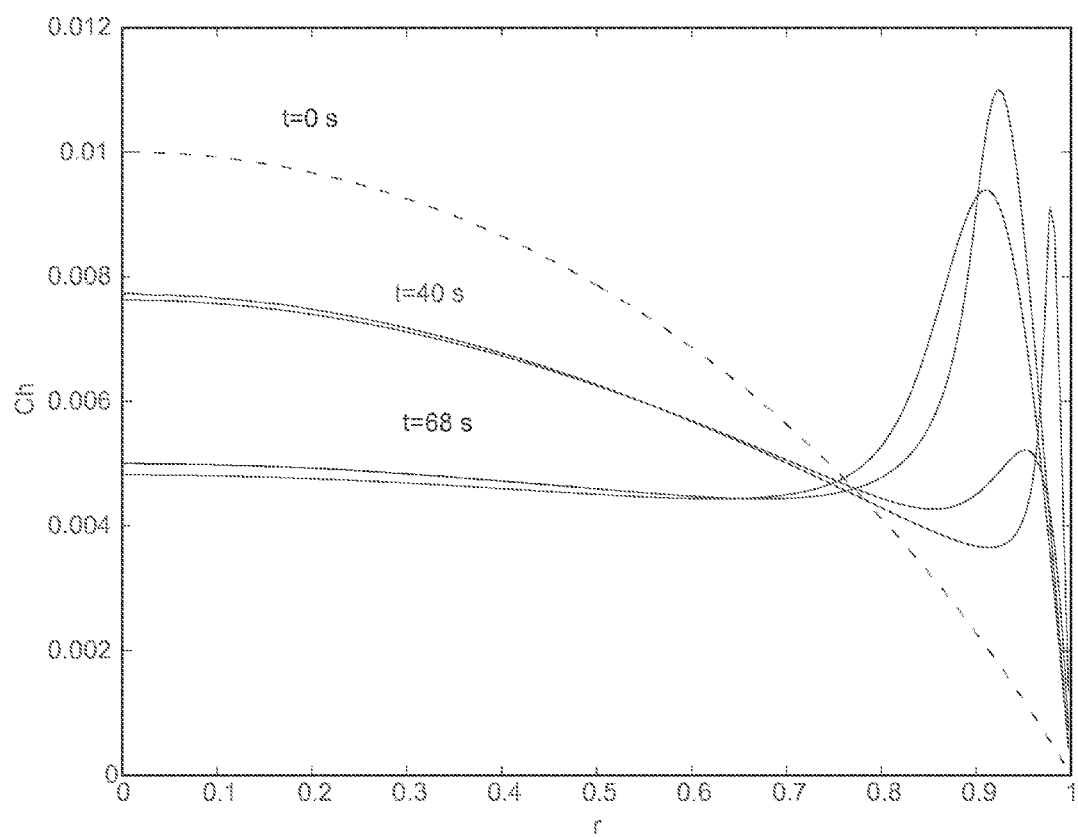

FIGS. 11A-C are additional simulation results of an embodiment of the present invention that illustrate the evolution over time of a droplet. The physical parameters used to produce FIGS. 11A-C include: an initial fluid viscosity of $\mu_0^*=3.5\times10^{-3}$ Pa·s; a surface tension of $\sigma=32\times10^{-3}$ N/m; an initial evaporation rate of $J_0^*=10\times10^{-8}$ m/s; an initial solute concentration of $C_0=0.01$ g/cm$^3$; a solute gelation concentration of Cg=0.5 g/cm$^3$; a contact angle of $\theta=50°$; and a droplet volume of $20\times10^{-15}$ m$^3$. The simulations illustrated in FIGS. 11A-C are on a grid with 201 evenly distributed nodes. The simulation illustrated in FIGS. 11A-C is an axi-symmetric droplet sitting on a flat substrate. The simulation results described in FIGS. 11A-C use the Ozawa viscosity model described in equation (17). FIGS. 11A-C show results at time step t={0 seconds; 40 seconds; and 68 seconds}. FIGS. 11A-C illustrate the results of two simulations: a first simulation in which 1/Sc=0.01; and a second simulation in which 1/Sc=0.

FIG. 11A illustrates the height (h) of the droplet at various times. FIG. 11B illustrates the concentration (C) of solute in the droplet at various times. FIG. 11C illustrates the solute amount (Ch) in the droplet at various times.

Figure 12A:
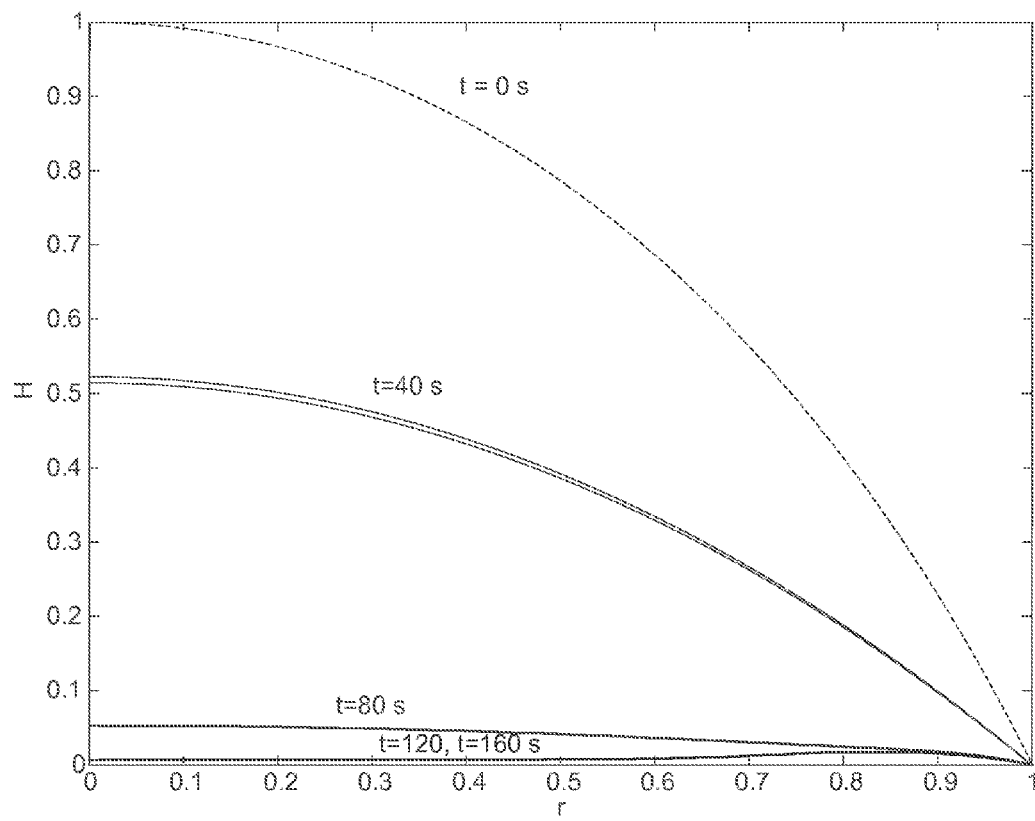
FIGS. 12A-C are graphical illustrations of simulations of the droplet evaporating on a flat substrate.
Figure 12B:
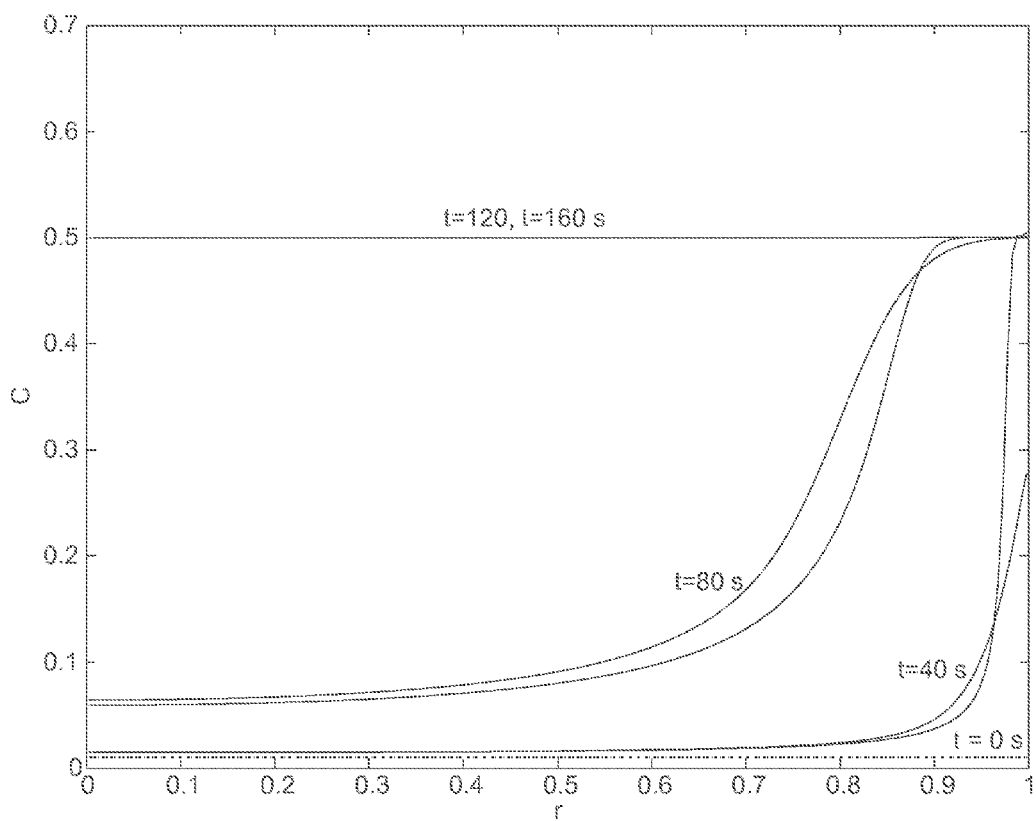
Figure 12C:
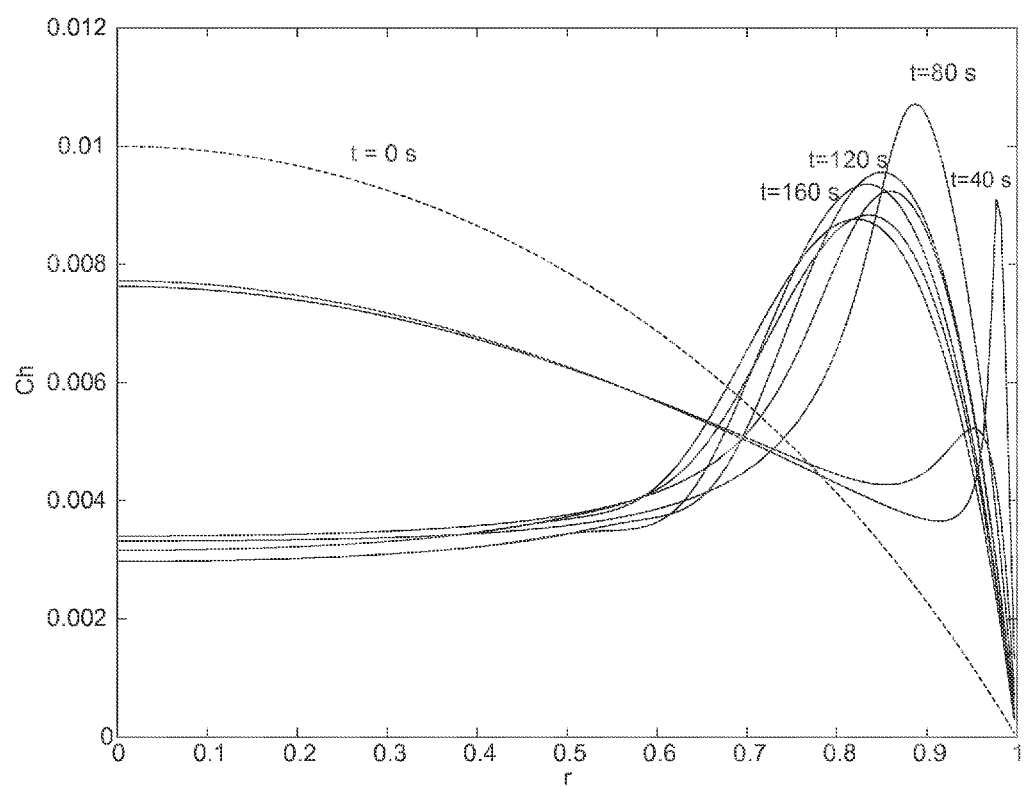

FIGS. 12A-C show results at time step t={0 seconds; 40 seconds; 80 seconds; 120 seconds; and 160 seconds} under simulation conditions such as those illustrated by FIGS. 11A-11C except that experimental data such as that illustrated in FIG. 2 are used instead of the Ozawa model.

Figure 13A:
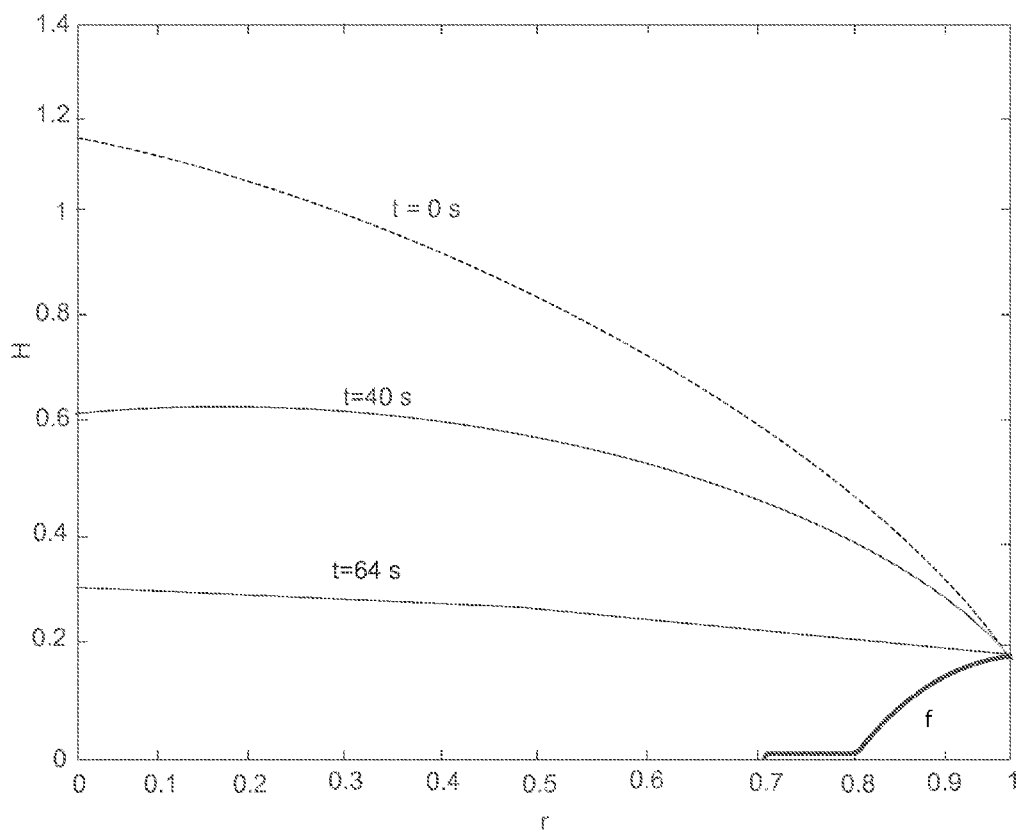
FIGS. 13A-C are graphical illustrations of simulations of the droplet evaporating on a flat substrate.
Figure 13B:
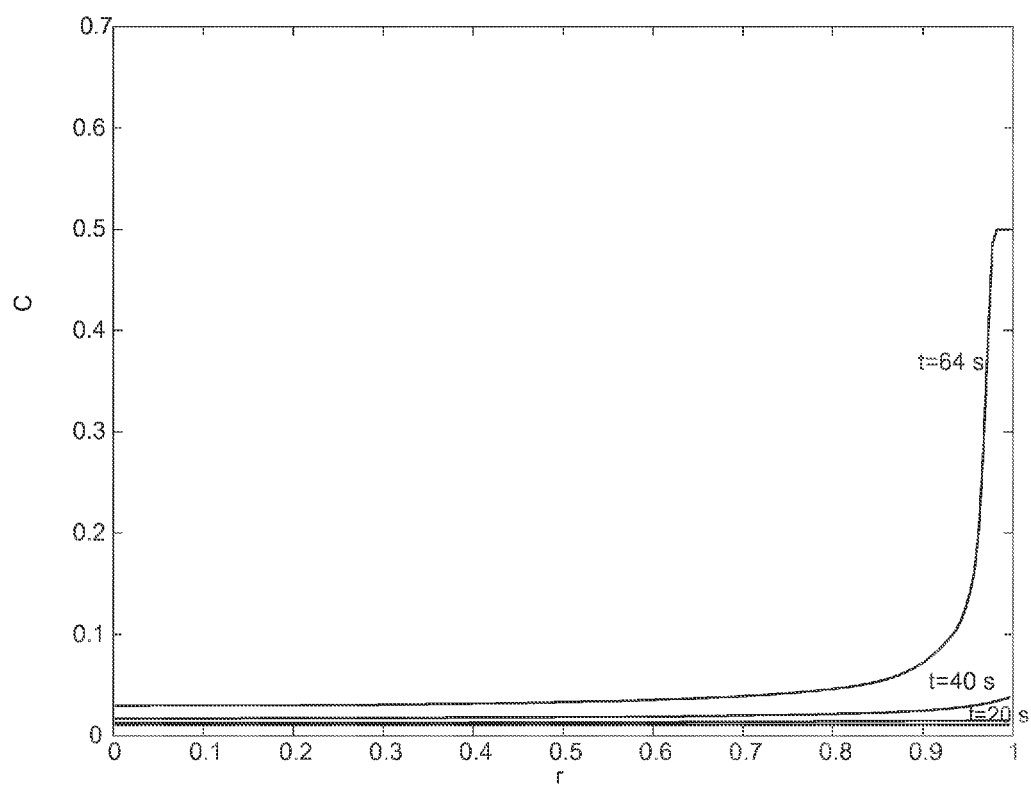
Figure 13C:
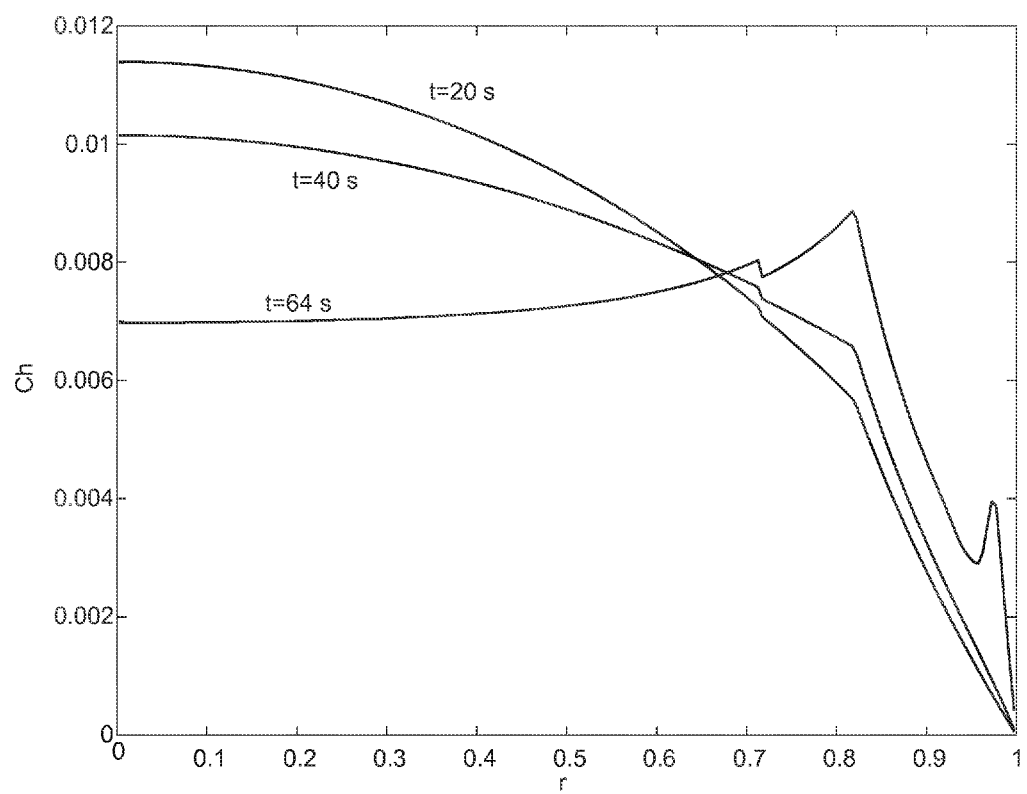

FIGS. 13A-C show results at time step t={0 seconds; 40 seconds; and 64 seconds} under simulation conditions such as those illustrated by FIGS. 12A-C in which the upwind method is compared to the centered difference method.

Figure 14A:
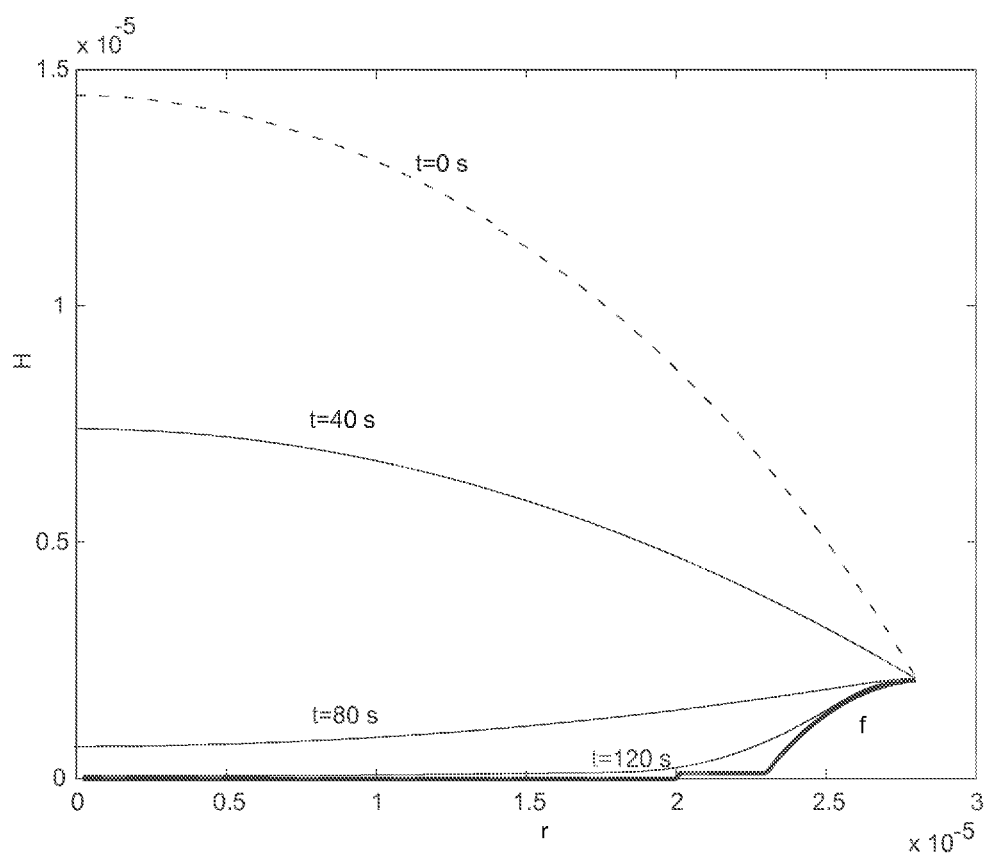
FIGS. 14A-C are graphical illustrations of simulations of the droplet evaporating on a flat substrate.
Figure 14B:
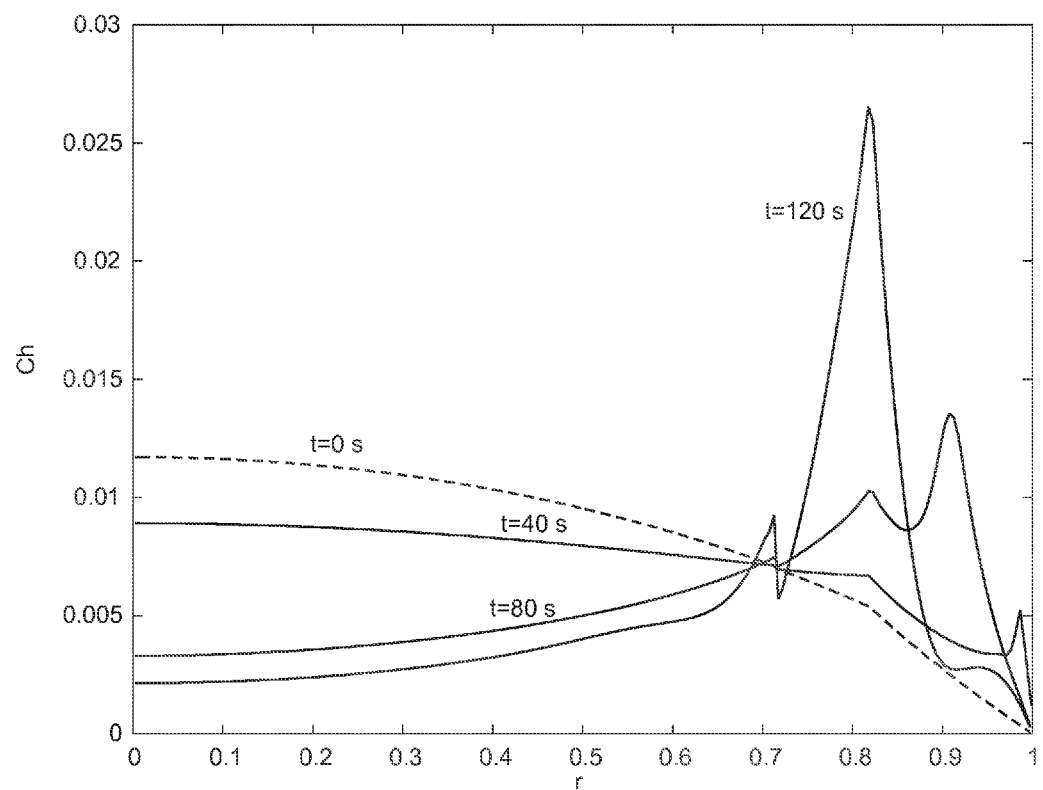
Figure 14C:
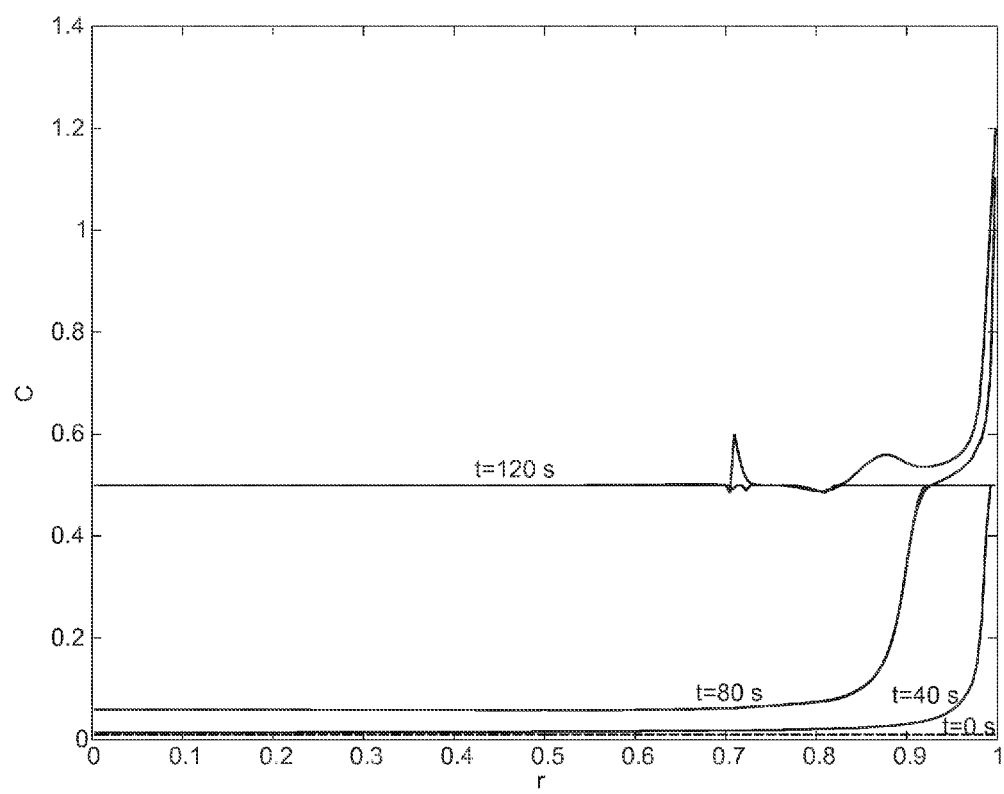

FIGS. 14A-C show results at time step t={0 seconds; 40 seconds; 80 seconds; and 120 seconds} under simulation conditions as those illustrated by FIGS. 13A-C in which the upwind method is compared to the centered difference method. The simulation results from FIGS. 14A-C are based on a numerical simulation in which the inverse of the Schmidt like number is 0.001 (1/Sc=0.001).

System

Figure 15:
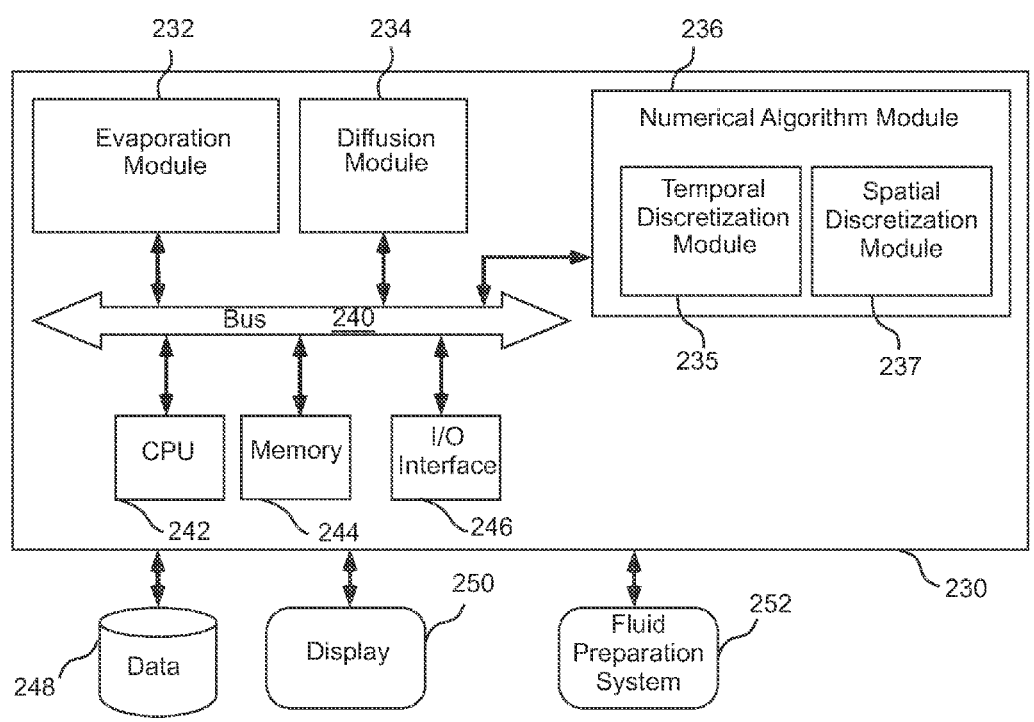
FIG. 15 is a simplified schematic diagram illustrating a system utilized to implement one or more aspects of the present invention.

Having described the details of the embodiments of the present invention, an exemplary system 230, which may be used to implement one or more aspects of the present invention, will now be described with reference to FIG. 15. As illustrated in FIG. 15, the system includes a processor 242 that provides computing resources and controls a computer. The processor (or CPU) 242 may be implemented with a microprocessor or the like, and may also include a graphics processor and/or a floating point coprocessor for mathematical computations. The system 230 also includes memory 244 which may be in the form of random-access memory (RAM) and read-only memory (ROM). The system 230 may also include an I/O interface 246 to enable data input/output operations as well as interfacing with a fluid preparation system 252. The I/O interface 246 may also provide an interface to one or more sensors to input data such as pressure, temperature, viscosity, etc. The fluid preparation system 252 may receive simulation data from the system 230 to enable the fluid preparation system 252 to adjust fluid properties of the fluid that is to be used in the inkjet printing process.

The system 230 further includes an evaporation module 232 that describes how a height profile of the droplet on a non-flat substrate changes over time in accordance with equation (39). A diffusion module 234 describes how the concentration profile of the solute in the droplet changes over time in accordance with equation (40). A numerical algorithm module 236 is used to solve the governing equations in accordance with the evaporation module 232 and the diffusion module 234 taking the boundary conditions described by equations (41) and (42) in to account. The numerical algorithm module 236 includes a temporal discretization module 235 and a spatial discretization module 237. Modules 235 and 237 perform the computational functionality described with reference to equations (43)-(47) and (48)-(57). In an embodiment of the present invention modules 232-237 may be implemented as interpreted and/or compiled computer code which may be stored in memory 244 and executed by a processor 242. The computational functionality performed by modules 232-237 may overlap occurring sequentially or in parallel. In an embodiment of the present invention, all modules that are a part of the system 230 are coupled together through an internal bus 240. One or more of the modules may also be coupled together through an external bus.

A number of controllers and peripheral devices may also be provided. In an embodiment of the present invention a display 250 may be used to present a simulation of the behavior of a droplet as it evaporates over time. The display 250 may show droplet properties selected from the group consisting of: physical properties; mechanical properties; fluid properties; statistical properties; final pattern of the droplet and other properties that are representative of the droplet its method of evaporation and its final state. The display 250 may use graphical or numerical methods of displaying the droplet properties. The display 250 may show simulation results which are an approximation of the effect of changes in environmental and other simulation properties on droplet properties. A storage module 248 may be used to store data about the simulation, the results of the simulation, complied code of the simulation, and/or interpreted code of the simulation.

A computer readable media such as magnetic tape or disk, or an optical medium can be used to store or record programs of instructions for operating systems, utilities and applications which may include embodiments of programs that implement various aspects of the present invention.

In the illustrated system, all major system components may connect to the bus 240, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape, disk, optical disc, or a transmitter receiver pair.

Flowchart

Figure 16:
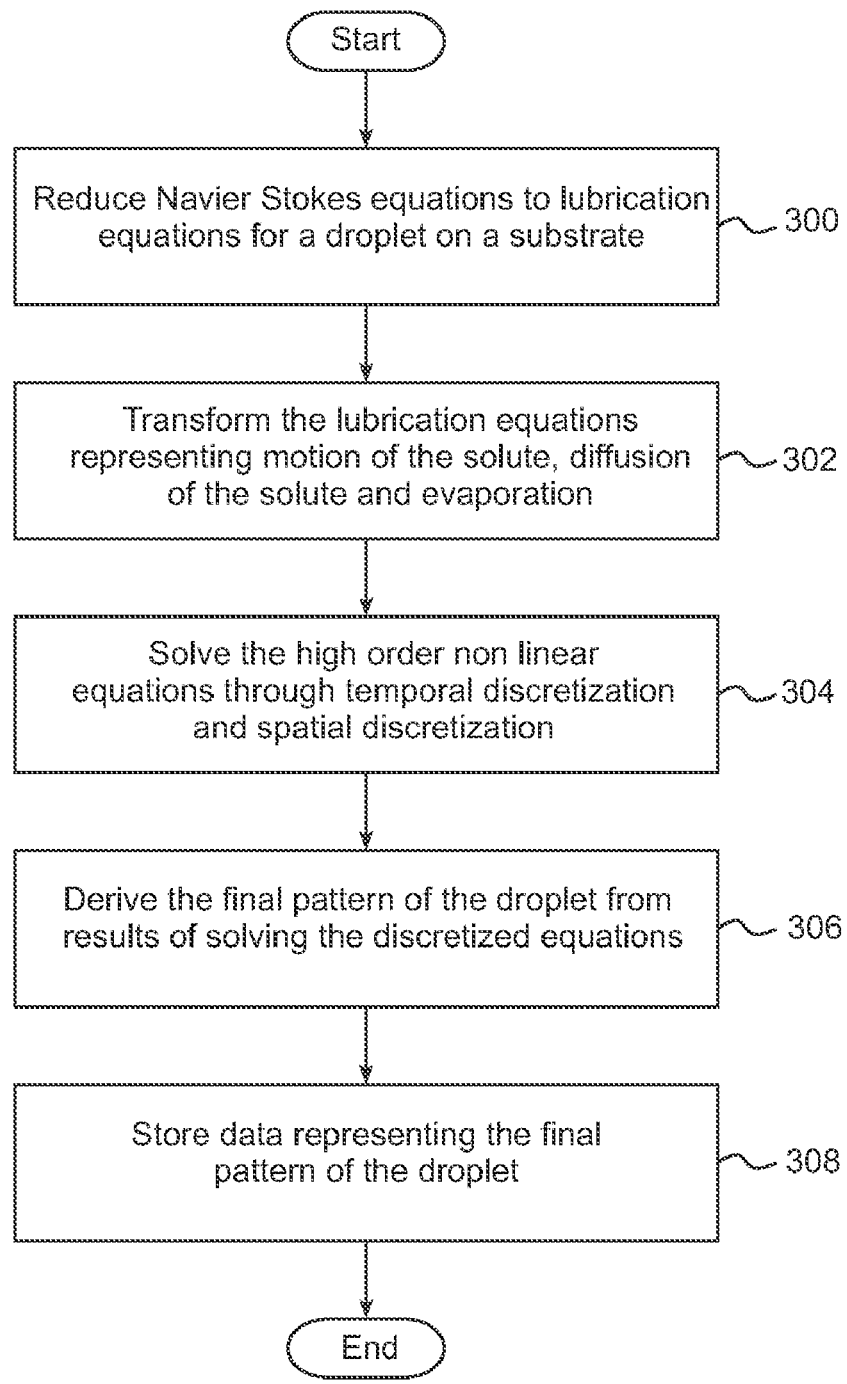
FIG. 16 is a flowchart diagram illustrating the method operations for simulating the final pattern for a droplet in accordance with one embodiment of the invention.

FIG. 16 is a flowchart diagram illustrating a method 300 for simulating the final pattern for a droplet in accordance with one embodiment of the invention. The method initiates with operation 302 where the Navier Stokes equations are reduced to lubrication equations for the droplet on a non-flat substrate. Equations 1-47 provide the details for the reduction of the Navier Stokes equations to the lubrication equations, as well as the assumptions and boundary conditions. The lubrication equations are high order non-linear equations. In one embodiment of the present invention it may be assumed that the droplet evaporating is axi-symmetric. An individual skilled in the art would appreciate how to adapt the disclosed method to a droplet that lacked axial symmetry.

The method 300 then proceeds to operation 304 where the high order non-linear equations are solved through temporal discretization and spatial discretization. Equations 48-77 provide specific details on how the discretization may be performed in an embodiment of the present invention. Other embodiments of the present invention may include other methods of spatial and temporal discretization without going beyond the scope and spirit of the present invention. In one embodiment of the present invention, the spatial discretization is achieved through a central difference expression.

The method 300 then moves on to operation 306 where the final pattern of the droplet is generated from the above described calculations. In an operation 308 data about the final pattern of the droplet is stored and may also be displayed to a user. Thus, a user is able to simulate the pattern and achieve with a high degree of confidence a desired pattern by manipulating parameters for the droplet and simulating the patterns for each combination of parameters.

The present invention may be conveniently implemented with software. However, alternative implementations are certainly possible, including a hardware implementation or a software/hardware implementation. Any hardware-implemented functions may be realized using application specific integrated circuits ASIC(s), digital signal processing circuitry, field programmable gate arrays (FPGA), programmable logic devices (PLD), or the like. Accordingly, any "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

It should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as a carrier network, or it may be a general purpose computer selectively activated or configured by a computer program stored in the computer or on a computer readable medium. In particular, various general purpose machines may be used with computer programs written in accordance with the teachings herein, or it may be more convenient to construct a more specialized apparatus to perform the required operations.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network or a backplane.

The invention can also be embodied as computer readable code on a tangible computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A non-transitory computer-readable medium encoded with instructions for a processor to perform a method for simulating a final pattern of a droplet of a fluid, the instructions comprising:
    instructions for using lubrication equations to represent behavior of the droplet on a substrate, wherein the lubrication equations include:
        a simulation space that is representative of an environment in which the droplet is being simulated;
        a velocity function that is representative of motion of fluid inside the droplet as a function of space and time;
        a thickness function that is representative of a height of the droplet above the substrate as a function of space and time;
        a concentration function that is representative of a concentration of solute in the droplet as a function of space and time;
        a solute amount function that is a product of the concentration function and the thickness function; and
        a first function that is a product of a solute amount and the velocity function;
    instructions for using the lubrication equations to represent using a first equation to represent a relationship between a temporal derivative of the solute amount and a spatial derivative of the first function;
    instructions for approximating the spatial derivate of the first function at a first node in the simulation space by calculating a difference between the first function evaluated at a second point in the simulation space and the first function evaluated at a third point in the simulation space;
    instructions for evaluating the first function at the second point in the simulation space includes:
        instructions for determining a sign of the velocity function at the second point in space;
        instructions for evaluating the first function at the second point in the simulation space, if an averaged radial velocity at the second point in the simulation space is positive, as a product of:
            the velocity function at the second point in the simulation space and
            a solute amount at the first point in the simulation space;
        instructions for evaluating the first function at the second point in the simulation space, if an averaged radial velocity at the second point in the simulation space is negative as, a product of:
            the velocity function at the second point in the simulation space and
            a solute amount at a fourth point in the simulation space;
        instructions for evaluating the first function at the third point in the simulation space, if an averaged radial velocity at the third point in the simulation space is positive as, a product of:

the velocity function at the third point in the simulation space and a solute amount at the fifth point in the simulation space;

instructions for evaluating the first function at the third point in the simulation space, if an averaged radial velocity at the third point in the simulation space is negative as, a product of:

the velocity function at the third point in the simulation space and a solute amount at a first point in the simulation space;

instructions for deriving the final pattern of the droplet from results from solving the lubrication equations; and instructions for storing the final pattern.

2. The non-transitory computer-readable medium as recited in claim 1, wherein the first function also represents how diffusion of a solute in a solvent effects a first product.

3. The non-transitory computer-readable medium as recited in claim 2, wherein an effect of diffusion is not taken into account when an inverse of a dimensionless Schmidt like number is less than 0.0001, wherein the inverse of the dimensionless Schmidt like number is equal to: a diffusion coefficient of a solution multiplied by an initial height of the droplet raised to the fourth power, divided by two, divided by an initial evaporation rate of the droplet, and divided by an initial radius of the droplet.

4. The non-transitory computer-readable medium of claim 1, further comprising:

characterizing the droplet as axi-symmetric.

5. The non-transitory computer-readable medium of claim 1, wherein the substrate is a non-flat substrate, and the lubrication equations further include:

a substrate function that is representative of the relative height of the substrate as function of space;

a height function that is representative of the height of the droplet above a plane as a function of space and time, wherein the thickness function is a function of the difference between the height function and the substrate function; and a second equation that represents how the height function varies over time by describing the relationship between a temporal derivative of the height function and spatial derivates of the thickness function, the height function and an evaporation function that describes the rate at which solvent is evaporated from the droplet.

6. The non-transitory computer-readable medium of claim 5, wherein the second equation includes a first high order differential function that is representative of the behavior of a height of the droplet over time; wherein a third function is equated to a fourth function; the third function is representative of a temporal derivative of the height function (H); the fourth function includes a first term that is a function of the thickness function (H–f) and a Laplacian of the height function ($\nabla^2 H$).

7. The non-transitory computer-readable medium of claim 6, wherein the fourth function includes a second term that is representative of the evaporation rate of the droplet.

8. A system including the non-transitory computer-readable medium, instructions and processor of claim 1.

* * * * *